(12) United States Patent
Spain

(10) Patent No.: US 12,367,339 B1
(45) Date of Patent: Jul. 22, 2025

(54) METHODS AND SYSTEMS FOR DYNAMIC PROCUREMENT DATA MINING

(71) Applicant: CDW LLC, Vernon Hills, IL (US)

(72) Inventor: Marty Spain, Indian Head, MD (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 17/686,863

(22) Filed: Mar. 4, 2022

(51) Int. Cl.
*G06F 40/30* (2020.01)
*G06F 16/951* (2019.01)
*G06F 40/216* (2020.01)

(52) U.S. Cl.
CPC .......... *G06F 40/216* (2020.01); *G06F 16/951* (2019.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 7,565,304 B2 * | 7/2009 | Casati | ............... | G06Q 10/06312 705/7.41 |
| 8,589,399 B1 * | 11/2013 | Lee | ....................... | G06F 16/313 707/737 |
| 8,676,667 B1 * | 3/2014 | Paiz | ....................... | G06F 16/951 707/706 |
| 8,977,613 B1 * | 3/2015 | Cooke | ................. | G06F 3/04842 707/754 |
| 9,378,044 B1 * | 6/2016 | Gaurav | ................. | G06F 9/5077 |
| 10,068,304 B1 * | 9/2018 | Shuklabaidya | ........ | G06Q 50/26 |
| 10,223,465 B2 * | 3/2019 | Goldenstein | ...... | G06F 16/24575 |
| 10,546,311 B1 * | 1/2020 | Gupta | ................ | G06Q 30/0204 |
| 10,643,227 B1 * | 5/2020 | Gupta | ................ | G06Q 30/0204 |
| 11,095,520 B1 * | 8/2021 | Bhat | ................... | H04L 41/5051 |
| 11,232,383 B1 * | 1/2022 | Burns, Sr | ........... | G06Q 10/0637 |
| 2001/0049671 A1 * | 12/2001 | Joerg | .................... | G06F 16/951 706/50 |

(Continued)

OTHER PUBLICATIONS

Wikipedia (http://web.archive.org/web/20201222030132/https://en.wikipedia.org/wiki/Artificial_neural_network), Artificial Neural Network, 2020, wayback machine, pp. 1-27. (Year: 2020).*

(Continued)

*Primary Examiner* — Lamont M Spooner
(74) *Attorney, Agent, or Firm* — MARSHALL, GERSTEIN & BORUN LLP

(57) ABSTRACT

Systems, methods, and computer-readable medium storing instructions for generating predicted resource allocation information of an organization based on dynamically ingested data, including ingesting context information, ingesting public data, ingesting record data, normalizing the public data with the record data, determining a first set of weights corresponding to the record data and a second set of weights corresponding to the public data, generating predicted resource allocation information, and causing the predicted resource allocation information to be displayed. In some aspects, additional information may be received or ingested, including one or more of additional public data, additional private data, or feedback from a user. The additional information may be used for adjusting one or more of the first set of weights or the second set of weights.

20 Claims, 9 Drawing Sheets

(56) References Cited

U.S. PATENT DOCUMENTS

| | | | |
|---|---|---|---|
| 2005/0004789 A1* | 1/2005 | Summers | G06Q 99/00 434/350 |
| 2005/0096943 A1* | 5/2005 | Siegalovsky | G16H 20/10 705/2 |
| 2005/0114171 A1* | 5/2005 | Siegalovsky | G06Q 50/22 705/2 |
| 2005/0160014 A1* | 7/2005 | Moss | G06Q 30/0259 705/26.61 |
| 2005/0209942 A1* | 9/2005 | Ballow | G06Q 40/00 705/35 |
| 2005/0209943 A1* | 9/2005 | Ballow | G06Q 40/12 705/35 |
| 2005/0209944 A1* | 9/2005 | Ballow | G06Q 40/04 705/35 |
| 2005/0209946 A1* | 9/2005 | Ballow | G06Q 40/06 705/35 |
| 2005/0209948 A1* | 9/2005 | Ballow | G06Q 10/06375 705/36 R |
| 2008/0091514 A1* | 4/2008 | Fung | G06Q 10/10 705/7.29 |
| 2008/0103868 A1* | 5/2008 | Santos | G06Q 10/06398 705/7.17 |
| 2009/0198593 A1* | 8/2009 | Klug | G06Q 30/02 705/26.1 |
| 2010/0179930 A1* | 7/2010 | Teller | G06N 20/00 706/12 |
| 2011/0225027 A1* | 9/2011 | Herrera Schuvab | G06Q 30/0601 705/26.1 |
| 2011/0320441 A1* | 12/2011 | Lee | G06F 16/9535 707/723 |
| 2012/0136763 A1* | 5/2012 | Megdal | G06Q 10/0637 705/30 |
| 2012/0150657 A1* | 6/2012 | Rubinstein | G06Q 30/0275 705/14.66 |
| 2013/0166395 A1* | 6/2013 | Vassilvitskii | G06Q 30/0244 705/14.73 |
| 2013/0332388 A1* | 12/2013 | Martell | A63F 13/35 705/36 R |
| 2013/0339099 A1* | 12/2013 | Aidroos | G06Q 50/01 705/7.36 |
| 2014/0100944 A1* | 4/2014 | Zhu | G06Q 30/0275 705/14.71 |
| 2014/0122228 A1* | 5/2014 | Wical | G06Q 30/02 705/14.53 |
| 2014/0201836 A1* | 7/2014 | Amsler | H04L 63/20 726/23 |
| 2014/0258032 A1* | 9/2014 | Psota | G06Q 10/08 705/26.35 |
| 2014/0282352 A1* | 9/2014 | Alonzo | G06Q 10/06 717/101 |
| 2014/0372180 A1* | 12/2014 | MacNair | G06Q 30/0205 705/7.34 |
| 2015/0057994 A1* | 2/2015 | Fang | G06F 40/253 704/4 |
| 2015/0073929 A1* | 3/2015 | Psota | G06Q 30/0201 705/26.2 |
| 2015/0154613 A1* | 6/2015 | Ma | G06Q 30/0201 705/7.29 |
| 2015/0161662 A1* | 6/2015 | Minor | G06Q 30/0275 705/14.48 |
| 2016/0005090 A1* | 1/2016 | Vollenweider | G06Q 30/0611 705/26.4 |
| 2016/0026720 A1* | 1/2016 | Lehrer | G06F 16/23 707/710 |
| 2016/0070705 A1* | 3/2016 | Chevalier | G06F 16/24578 707/728 |
| 2016/0178796 A1* | 6/2016 | Abramowitz | G01V 99/00 702/2 |
| 2016/0196563 A1* | 7/2016 | Srinivasan | G06Q 50/01 705/7.29 |
| 2016/0232003 A1* | 8/2016 | Kompella | G06F 8/77 |
| 2016/0283880 A1* | 9/2016 | Jin | G06Q 30/0202 |
| 2017/0013047 A1* | 1/2017 | Hubbard | H04L 67/535 |
| 2017/0078392 A1* | 3/2017 | Gray | H04L 67/02 |
| 2017/0109685 A1* | 4/2017 | Bianchi | G06Q 10/063118 |
| 2017/0124579 A1* | 5/2017 | Crabtree | G06Q 30/0202 |
| 2017/0169378 A1* | 6/2017 | Balasubramanian | G06F 16/951 |
| 2017/0170960 A1* | 6/2017 | Shaked | H04L 63/0442 |
| 2017/0213294 A1* | 7/2017 | Cabrera | G06Q 40/123 |
| 2018/0081861 A1* | 3/2018 | Danielyan | G06F 40/295 |
| 2018/0144266 A1* | 5/2018 | Osogami | G06N 3/047 |
| 2018/0173372 A1* | 6/2018 | Greenspan | G06F 16/2465 |
| 2018/0174060 A1* | 6/2018 | Velez-Rojas | G06N 5/02 |
| 2018/0197082 A1* | 7/2018 | Kajino | G06N 7/01 |
| 2018/0314978 A1* | 11/2018 | Kajino | G06N 20/00 |
| 2019/0066133 A1* | 2/2019 | Cotton | G06Q 30/0202 |
| 2019/0073997 A1* | 3/2019 | Millen | G10L 15/16 |
| 2019/0138997 A1* | 5/2019 | Haas | G06Q 10/105 |
| 2019/0155961 A1* | 5/2019 | Alonso | G06F 16/951 |
| 2019/0188742 A1* | 6/2019 | Vasudevan | G06Q 10/063112 |
| 2019/0279239 A1* | 9/2019 | Ikemoto | G06Q 30/0206 |
| 2019/0317991 A1* | 10/2019 | Abrahams | G06F 16/9038 |
| 2019/0370029 A1* | 12/2019 | Agnoli | G06F 16/24578 |
| 2020/0026708 A1* | 1/2020 | Ahn | G06F 9/5005 |
| 2020/0034776 A1* | 1/2020 | Peran | G06N 5/022 |
| 2020/0042920 A1* | 2/2020 | Moorthy | G06N 7/01 |
| 2020/0134498 A1* | 4/2020 | Harry Putra | G06N 3/047 |
| 2020/0160190 A1* | 5/2020 | Swamy | G06F 40/279 |
| 2020/0218740 A1* | 7/2020 | Kraus | G06F 16/285 |
| 2020/0250249 A1* | 8/2020 | Fedoryszak | G06F 16/9538 |
| 2020/0327474 A1* | 10/2020 | Malpani | G06Q 10/06393 |
| 2020/0387819 A1* | 12/2020 | Rogynskyy | G06N 20/00 |
| 2021/0044535 A1* | 2/2021 | Ignatyev | H04L 47/83 |
| 2021/0049687 A1* | 2/2021 | Abu Libda | G06F 16/245 |
| 2021/0073282 A1* | 3/2021 | Hunter | G06N 3/086 |
| 2021/0073287 A1* | 3/2021 | Hunter | H04L 67/133 |
| 2021/0182756 A1* | 6/2021 | Feng | G06N 20/00 |
| 2021/0217031 A1* | 7/2021 | Zhang | G06Q 10/105 |
| 2021/0232574 A1* | 7/2021 | Kvochko | H04L 63/105 |
| 2021/0234884 A1* | 7/2021 | Brown | H04L 63/1433 |
| 2022/0044334 A1* | 2/2022 | Blaikie, III | G06Q 30/0204 |
| 2022/0156698 A1* | 5/2022 | Dua | G06Q 10/105 |
| 2022/0215313 A1* | 7/2022 | Castinado | G06N 20/00 |
| 2022/0245574 A1* | 8/2022 | Cella | G06Q 10/087 |
| 2022/0253780 A1* | 8/2022 | Lierni | G06Q 10/06375 |
| 2022/0383225 A1* | 12/2022 | Berkowitz | G06Q 30/0201 |
| 2023/0011954 A1* | 1/2023 | Elserafy | G06Q 10/06375 |
| 2023/0092066 A1* | 3/2023 | Cella | H04W 4/70 702/188 |

OTHER PUBLICATIONS

Usaspending.gov, "Homepage," (2022). Retrieved from Internet on Mar. 3, 2022: URL: https://www.usaspending.gov/.

U.S. Department of Defense, "Contracts," (2022). Retrieved from Internet on Mar. 3, 2022: URL: https://www.defense.gov/News/Contracts/.

Usaspending.gov, "USAspending Database Archive—Recommended Download and Restoration Process," (2022). Retrieved from Internet on Mar. 3, 2022: URL: https://files.usaspending.gov/database_download/usaspending-db-setup.pdf.

* cited by examiner

FIG. 2C-1

USASPENDING.gov — Spending Explorer · Award Search · Profiles · Download · Resources AWARD PROFILE
Contract Summary

Share · Download

Definitive Contract — PIID HR001121C0244

| Awarding Agency | Recipient | Related Awards |
|---|---|---|
| Department of Defense (DOD) | RAYTHEON BBN TECHNOLOGIES CORP. 10 MOULTON ST CAMBRIDGE, MA 02138-1119 Congressional District: MA-05 UNITED STATES | Parent Award Unique Key N/A |

In Progress (1 year, 8 months remain)

Dates
- Start Date — Oct 01, 2021
- Current End Date — Sep 30, 2023
- Potential End Date — Sep 30, 2025

$ Award Amounts

$96,781 Obligated Amount
$1.1M Current Award Amount
$2.3M Potential Award Amount

| | |
|---|---|
| Obligated Amount | $96,781.00 |
| Current Amount | $1,148,398.00 |
| Potential Amount | $2,271,385.00 |

Description
THE PRIMARY GOAL OF THIS ENVISION EFFORT IS TO DRAMATICALLY REDUCE THE SIZE AND WEIGHT OF NIGHT VISION GOGGLES INTO AN EYEGLASS FORM FACTOR WITH DRASTICALLY IMPROVED SENSITIVITY, NOISE REDUCTION AND SPEED.

North American Industry Classification System (NAICS) Code
- 54: Professional, Scientific, and Technical Services
- 5417: Scientific Research and Development Services
- 541715: Research and Development in the Physical, Engineering, and Life Sciences (except Nanotechnology and Biotechnology)

Product or Service Code (PSC)
RESEARCH AND DEVELOPMENT
- AC: DEFENSE SYSTEMS R&D
- AC1: R&D - DEFENSE SYSTEMS: AIRCRAFT
- AC11: R&D - DEFENSE SYSTEMS: AIRCRAFT (BASIC RESEARCH)

200C / 202C

From FIG. 2C-1

To FIG. 2C-3

METHODS AND SYSTEMS FOR DYNAMIC PROCUREMENT DATA MINING

TECHNICAL FIELD

The present disclosure generally relates to generating predicted resource allocation information of an organization based on dynamically ingested data.

BACKGROUND

Data analytics are frequently adopted in decision-making tools. Among the many drivers of the adoption of data analytics in decision-making tools is the increase in computing power available for data mining, processing, and data visualization. Data analytics may be used by organizations so that information from internal and external data sources may be ingested and processed for informing decision making. Organizations may analyze trends in sales, marketing, strategic operations, capital, finance, etc., thereby allowing organizations to make decisions based on quantifiable metrics instead of intuition and/or general best practices.

While many organizations collect useful data on their operations, these data are often only analyzed locally within each organization. In keeping their data and data analytics private, organizations may aim to protect a competitive advantage and/or meet other privacy objectives. However, for a highly-interconnected landscape of organizations, decisions of one organization often have rippling effects that may change outcomes for other organizations, often of different sizes and/or in different market segments.

In conventional resource allocation, a purchasing organization (i.e., a requestor) may publish a request for quote (RFQ) and accept bids from one or more providing organizations. However, with existing techniques of data analytics, the other providing organizations may not be able to reliably infer the decision of the first providing organization. Without this knowledge, the other providing organizations may make less optimal decisions. The less optimal decisions may result in worse efficiency, such as worse resource allocation efficiency, which too may have rippling effects on the landscape of organizations. Accordingly, improved techniques are needed to generate and present more accurate, insightful, and relevant resource allocation predictions to organizations.

SUMMARY

In one aspect, computer system for generating predicted resource allocation information of an organization includes one or more processors; and a program memory coupled to the one or more processors and having stored thereon executable instructions that, when executed by the one or more processors, cause the computer system to: (1) ingest context information including one or more of (i) a seed identifier identifying an entity or (ii) an area of interest; (2) ingest, based on the context information, public data including one or more information sources; (3) ingest, based on the context information, record data including one or more records corresponding to the organization; (4) normalize the ingested public data with the ingested record data; (5) determine a first set of weights each corresponding to a respective record of the ingested record data and a second set of weights each corresponding to an information source of the ingested public data; (6) generate predicted resource allocation information of the organization related to the context information based on (i) the ingested record data and the corresponding first set of weights, and (ii) the ingested public data and the corresponding second set of weights; and (7) cause the predicted resource allocation information of the organization to be displayed.

In another aspect, a computer-implemented method for generating predicted resource allocation information of an organization includes (1) ingesting, by one or more processors, context information including one or more of (i) a seed identifier identifying an entity or (ii) an area of interest; (2) ingesting, by the one or more processors, based on the context information, public data including one or more information sources; (3) ingesting, by the one or more processors, based on the context information, record data including one or more records of the organization; (4) normalizing, by the one or more processors, the ingested public data with the ingested record data; (5) determining, by the one or more processors, a first set of weights each corresponding to a respective record of the ingested record data and a second set of weights each corresponding to an information source of the ingested public data; (6) generating, by the one or more processors, predicted resource allocation information of the organization related to the context information based on (i) the ingested record data and the corresponding first set of weights, and (ii) the ingested public data and the corresponding second set of weights; and (7) causing, by the one or more processors, the predicted resource allocation information of the organization related to the context information to be displayed.

In yet another aspect, a tangible, non-transitory computer-readable medium having stored thereon executable instructions for generating predicted resource allocation information of an organization that when executed, cause a computer to: (1) ingest context information including one or more of (i) a seed identifier identifying an entity or (ii) an area of interest; (2) ingest, based on the context information, public data including one or more information sources;

(3) ingest, based on the context information, record data including one or more records corresponding to the organization; (4) normalize the ingested public data with the ingested record data; (5) determine a first set of weights each corresponding to a respective record of the ingested record data and a second set of weights each corresponding to an information source of the ingested public data; (6) generate predicted resource allocation information of the organization related to the context information based on (i) the ingested record data and the corresponding first set of weights, and (ii) the ingested public data and the corresponding second set of weights; and (7) cause the predicted resource allocation information of the organization to be displayed.

In various aspects, additional, fewer, or alternate actions may be included or performed by the method, the computer system, and the computer-readable medium, including those discussed elsewhere herein.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2C-1 illustrates a block diagram of another exemplary process for ingesting data based on context data, according to some aspects.

FIG. 2C-2 further illustrates the exemplary process for ingesting data based on context data illustrated in block diagram of FIG. 2C-1, according to some aspects.

FIG. 2C-3 further illustrates the exemplary process for ingesting data based on context data illustrated in block diagrams FIG. 2C-1 and FIG. 2C-2, according to some aspects.

DETAILED DESCRIPTION

Figure 1:
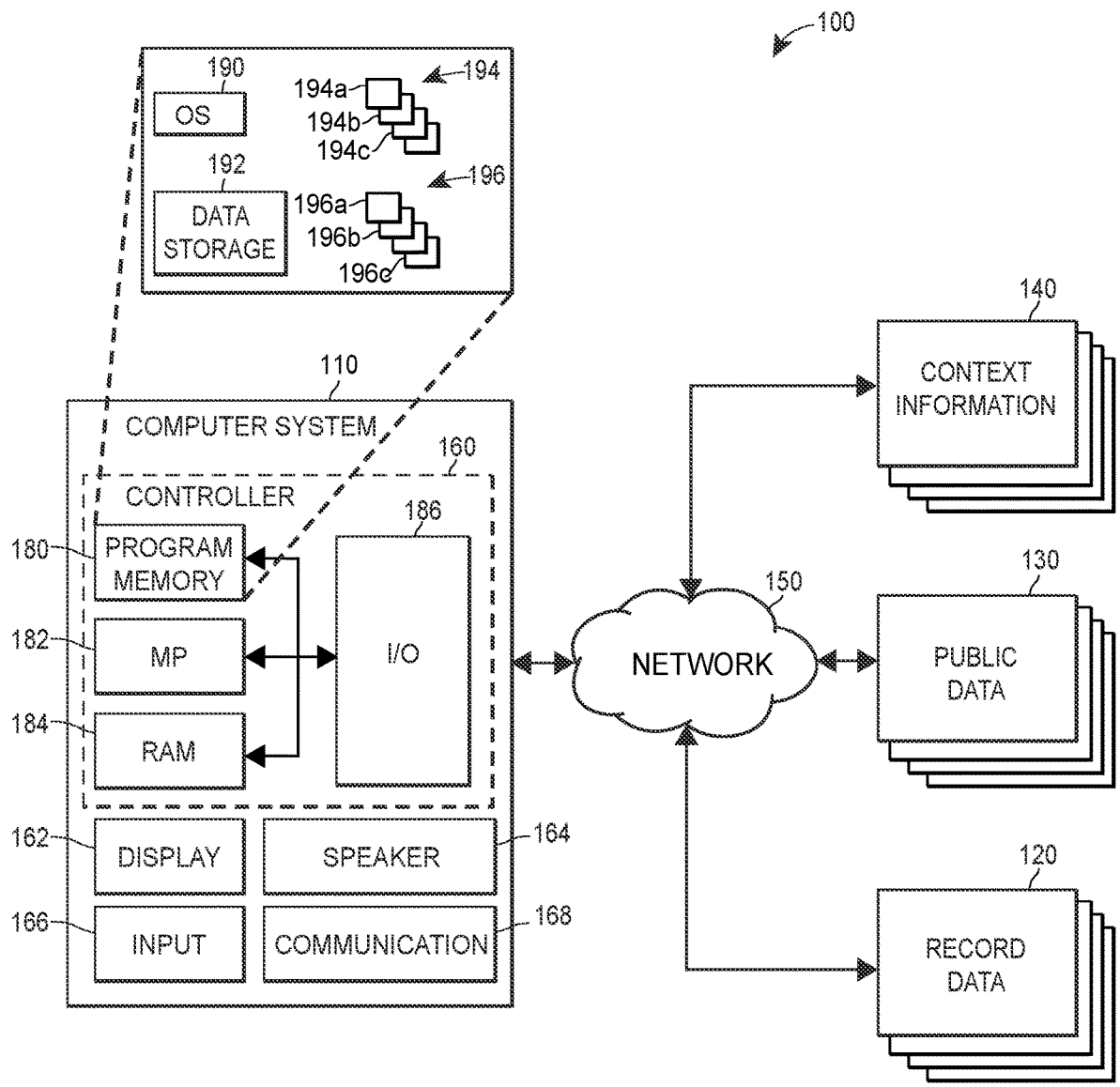
FIG. 1 illustrates a block diagram of an exemplary computing environment on which methods described herein may operate in accordance with aspects described herein.

The present techniques aim to reduce problems with conventional approaches with resource allocation predictions. In particular, the present techniques include computer systems, methods, and computer-readable media for predicting resource allocation information of an organization. Such predictions may be based on public data and record data and weights corresponding thereto. The weights may be updated based on additional public data and/or feedback from a user. The present techniques may determine correlations between specific resource allocation input decisions and specific resource allocation results.

When one or more first organizations makes one or more decisions regarding a particular contract, other organizations which may be in the decision-making process regarding the particular contract may be advantaged knowing the decisions (or a likelihood associated with one or more possible decisions) of the first organizations. A user at one of the other organizations (that may be a bidder for/seller of resources, or a requestor/asker of resources) may use present techniques to determine trends related to plans, actions, strategies, technologies, operations, and policies and specific resource allocation results of the first organization. Accordingly, the user may use the determined information, for example, to improve resource allocation efficiency of the organization.

Advantageously, by generating improved insights, the present techniques reduce complexity associated with automated decision-making processes for a primary providing organization bidding (e.g., on a request for quote (RFQ) for a contract of a purchasing organization), potentially in competition with many (e.g., one hundred or more) other bidders. Accordingly, efficiency may be increased, for both the providing organization and the purchasing organization, and guesswork and back and forth negotiation may be reduced. In particular, the bidding organization may be able to generate bids at a much higher speed and with far greater accuracy than via any conventional means. It will be appreciated that the gains in efficiency may also correspond to a reduction in required internal electronic communications (and accordingly bandwidth use) between members of the providing organization and a reduction in required external communications (and accordingly bandwidth use) between members of the providing organization and the purchasing organization. Further, the present techniques help purchasing organizations to avoid making less favorable decisions relating to resource allocation due to not realizing trends related to plans, actions, strategies, technologies, operations, and policies and specific resource allocation results of other organizations. Additional advantages of the to present techniques over conventional approaches of generating predicted resource allocation information will be appreciated throughout this disclosure by one having ordinary skill in the art.

Exemplary Computing Environment

FIG. 1 illustrates a block diagram of an exemplary computing environment 100 within which present techniques may be implemented in accordance with some aspects. The computing environment 100 may include a computer system 110, a record data source 120, a public data source 130, and a context information data source 140, at least some of which may be communicatively coupled via a network 150 that may be a proprietary network, a secure public internet, a virtual private network, or some other type of network, such as dedicated access lines, plain ordinary telephone lines, satellite links, cellular data networks, combinations of these, etc. Where the network 150 comprises the Internet, data communications may take place over the network 150 via an Internet communication protocol. In some aspects, more or fewer instances of the various components of the computing environment 100 may be included (e.g., one instance of the computer system 110, ten instances of the context information data source 140, one-thousand instances of the public data source 130, etc.) in the computing environment 100.

Exemplary Computer System

The computer system 110 may be any suitable device (e.g., a desktop computer, a notebook computer, a netbook computer, a smartphone, a tablet computer, a wearable electronic device, or similar mobile or stationary computing device capable of receiving and processing electronic information). The computer system 110 may include one or more internal sensors (not shown), which may provide sensor data regarding the local physical environment or the device's location therein. Such internal sensors may likewise facilitate user input to the computer system 110, such as by enabling the user to issue voice commands via a microphone (not shown). At least some of the functions of the computer system 110 may be performed by one or more servers (not shown) communicatively coupled to the computer system 110 via the network 150. For example, the one or more servers may perform overlapping functions or distinct functions as the computer system 110. In one aspect, a first server may provide information and/or data in response to requests and store information and/or data associated with such requests, while a second server may perform analysis on the information and/or data provided by the first server. The computer system 110 may include a controller 160, a display 162, one or more speakers 164, one or more inputs 166, and a communication unit 168. The components of the computer system 110 may be interconnected via an address/data bus or other means.

In some aspects, more or fewer instances of the various components of the computer system 110 may be included (e.g., one instance of the controller 160, two instances of the display 162, five instances of the speakers 164, etc.) in the computer system 110.

Exemplary Data Sources

The context information data source 140 may provide context information including a seed identifier identifying an entity and/or an area of interest for the computer system 110 to ingest. The context information data source 140 may provide context information to the computer system 110 automatically, and/or in response to a request. For example, a user of the computer system 110 may wish to generate predicted resource allocation information for an organization, and, in response, the context information data source 140 may send context information to the computer system 110 via the network 150. The context information data source 140 may be databases of context information themselves, or the context information data source 140 may be configured to receive context information, from a user, for example. The context information data source 140 may be maintained and/or operated by public or private organizations and may be updated regularly to reflect changes in one or more of (i) organization landscapes, structures, makeups, and/or behavior, (ii) resource allocation opportunities and/or trends, (iii) industry and/or market trends and/or best practices, etc. However, in other aspects, context information may not be provided to the computer system 110 solely from the context information data source 140. Instead, the context information may alternatively or additionally be received and ingested directly at the computer system 110. For example, a user may provide context information in the form of a seed identifier identifying an entity and/or an area of interest to the computer system 110 (e.g., via inputs), without requiring the use of the context information data source 140.

The public data source 130 stores public data including one or more information sources. The public data source 130 may provide public data to the computer system 110 automatically, and/or in response to a request. For example, after the computer system 110 has ingested context information, the computer system 110 may ingest public data related to the context information via the public data source 130 sending public data to the computer system 110 via the network 150. The computer system 110 may ingest public data from the public data source 130 using a webcrawler. The public data source 130 may be databases of public data themselves, or the public data source 130 may be configured to receive public data from other sources such as through accessing publicly-available internet sources (e.g., news sites, social media sites, blog sites, etc.). The public data source 130 may be maintained and/or operated by public and/or private information sources and may be updated regularly.

The record data source 120 stores record data including one or more records corresponding to the organization. The record data source 120 may provide record data to the computer system 110 automatically, and/or in response to a request. For example, after the computer system 110 has ingested context information, the computer system 110 may ingest record data related to the context information via the record data source 120 sending record data to the computer system 110 via the network 150. The computer system 110 may ingest record data from the record data source 120 using a webcrawler. The record data source 120 may be databases of record data themselves, or the record data source 120 may be configured to receive record data, such as through accessing publicly-available internet sources (e.g., government spending websites/databases). The record data source 120 may be maintained and/or operated by public and/or private organizations and may be updated regularly.

Exemplary Controller

The controller 160 may be configured to receive, process, produce, transmit, and/or store data. When the controller 160 (or other processor(s)) receives an indication of a user action and/or request, the controller 160 may determine appropriate responses and implement the appropriate responses. Such responses may include processing information and/or data for presentation to the user, requesting information and/or data from the one or more sources 120-140, determining information regarding the computer system 110, and/or causing information to be presented to be presented to a user. The controller 160 may include one or more program memories 180, one or more microcontrollers or microprocessors (MPs) 182, a random access memory (RAM) 184, and an I/O circuit 186. The components of the controller 160 may be interconnected via an address/data bus or other means. In some aspects, more or fewer instances of the various components of the controller 160 may be included (e.g., one instance of the I/O circuit 186, ten instances of the MPs 182, etc.) in the computer system 110.

The program memories 180 may include an operating system 190, a data storage 192, a plurality of software applications 194, and a plurality of software routines 196. In some aspects, more or fewer instances of the various components of the program memories 180 may be included (e.g., one instance of the operating system 190, ten instances of the software applications 194, etc.) in the program memories 180.

The MPs 182 may include one or more processors of any known or hereafter developed type, including general-purpose processors and/or special-purpose processors (e.g., one or more CPUs, one or more GPUs, one or more ASIC processors, etc.). Similarly, the controller 160 may include the RAM 184 and the program memories 180, respectively including one or more semiconductor memories, magnetically readable memories, optically readable memories, flash memories, non-transitory computer-readable media, etc.

The operating system 190, for example, may be one of a plurality of known operating systems such as Microsoft Windows®, macOS®, LINUX®, UNIX®, iOS®, Android™, Palm® webOS, Windows® Mobile/Phone, BlackBerry® OS, Chrome OS™, Symbian® OS, etc. The data storage 192 may include data such as application data for the plurality of applications 194, routine data for the plurality of routines 196, and other data necessary to interact with the network 150 and/or the data sources 120-140. In some aspects, the controller 160 may also include, or otherwise be communicatively connected to, other data storage mechanisms (e.g., one or more hard disk drives, optical storage drives, solid state storage devices, etc.) that reside within the computer system 110. Moreover, in thin-client and/or mobile implementations, additional processing/computation and data storage may be provided by an additional server component (not shown) connected to the computer system 110 via the network 150, and/or via a mobile device component (not shown).

The software applications 194 and/or routines 196 may include computer-readable instructions that cause the MPs 182 to implement data processing and communication functions. Thus, the software applications 194 may include a context information application 194a comprising one or more computer-executable instructions that, when executed, cause a computer system (e.g., the computer system 110) to ingest and process context information including one or more of a seed identifier identifying an entity and/or an area of interest; a public data application 194b comprising one or more computer-executable instructions that, when executed, cause a computer system (e.g., the computer system 110) to ingest public data; and/or a record data application 194c comprising one or more computer-executable instructions that, when executed, cause a computer system (e.g., the computer system 110) to ingest record data. The software routines 196 may support the software applications 194 and may include routines such as a communication routine 196a comprising one or more computer-executable instructions that, when executed, cause a computer system (e.g., the computer system 110) to communicate with the data sources 120-140 via the network 150, a weighting routine 196b comprising one or more computer-executable instructions that, when executed, cause a computer system (e.g., the computer system 110) to determine weights corresponding to data and/or information, and a data presentation routine 196c comprising one or more computer-executable instructions that, when executed, cause a computer system (e.g., the computer system 110) to generate and/or present received data to the user via the display 162. It should be understood that additional and/or alternative applications and/or routines may be included in the program memories 180, including other applications of the sort ordinarily stored on a computer system.

Exemplary Computer System Components

The display 162 and the speakers 164, along with other integrated and/or communicatively connected output devices (not shown), may be used to present information to the user of the computer system 110 or others. The display 162 may include any known and/or hereafter developed visual and/or tactile display technology, including LCD, OLED, AMOLED, projection displays, refreshable braille displays, haptic displays, and/or other types of displays. The speakers 164 may similarly include any controllable audible output device or component, which may include a haptic component and/or device. In some aspects, the speakers 164 may be communicatively connected speakers (e.g., headphones, Bluetooth headsets, docking stations with additional speakers, etc.). The inputs 166 may further receive events (e.g., instructions, selections, and/or other inputs) from a user of the computer system 110. The inputs 166 may include a physical and/or virtual keyboard, a microphone, virtual and/or physical buttons and/or dials, or other means of receiving information. In some aspects, the display 162 may include a touch screen or otherwise be configured to receive input from a user, in which case the display 162 and the inputs 166 may be combined.

The communication unit 168 may send and/or receive information from local or remote devices (e.g., sources 120-140), either directly or through the network 150. The computer system 110 may also communicate with a router or the network 150 using the communication unit 168, which may manage communication between the controller 160 and external devices. The communication unit 168 may transmit and receive wired and/or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 168 may also be capable of communicating using a near field communication standard (e.g., ISO/IEC 18092, standards provided by the NFC Forum, etc.). Furthermore, the communication unit 168 may provide input signals to the controller 160 via the I/O circuit 186. The communication unit 168 may also transmit sensor data, device status information, control signals, or other output from the controller 160 to the network 150.

In operation, the computing environment 100 may be used for generating predicted resource allocation information of an organization. Present techniques may use one or more components of the controller. For example, software applications 194a-c may be used in ingesting data and/or information, and routines 196a-c may be used in generating and/or presenting resource allocation information of an organization.

Exemplary Data Ingestion

Figure 2A:
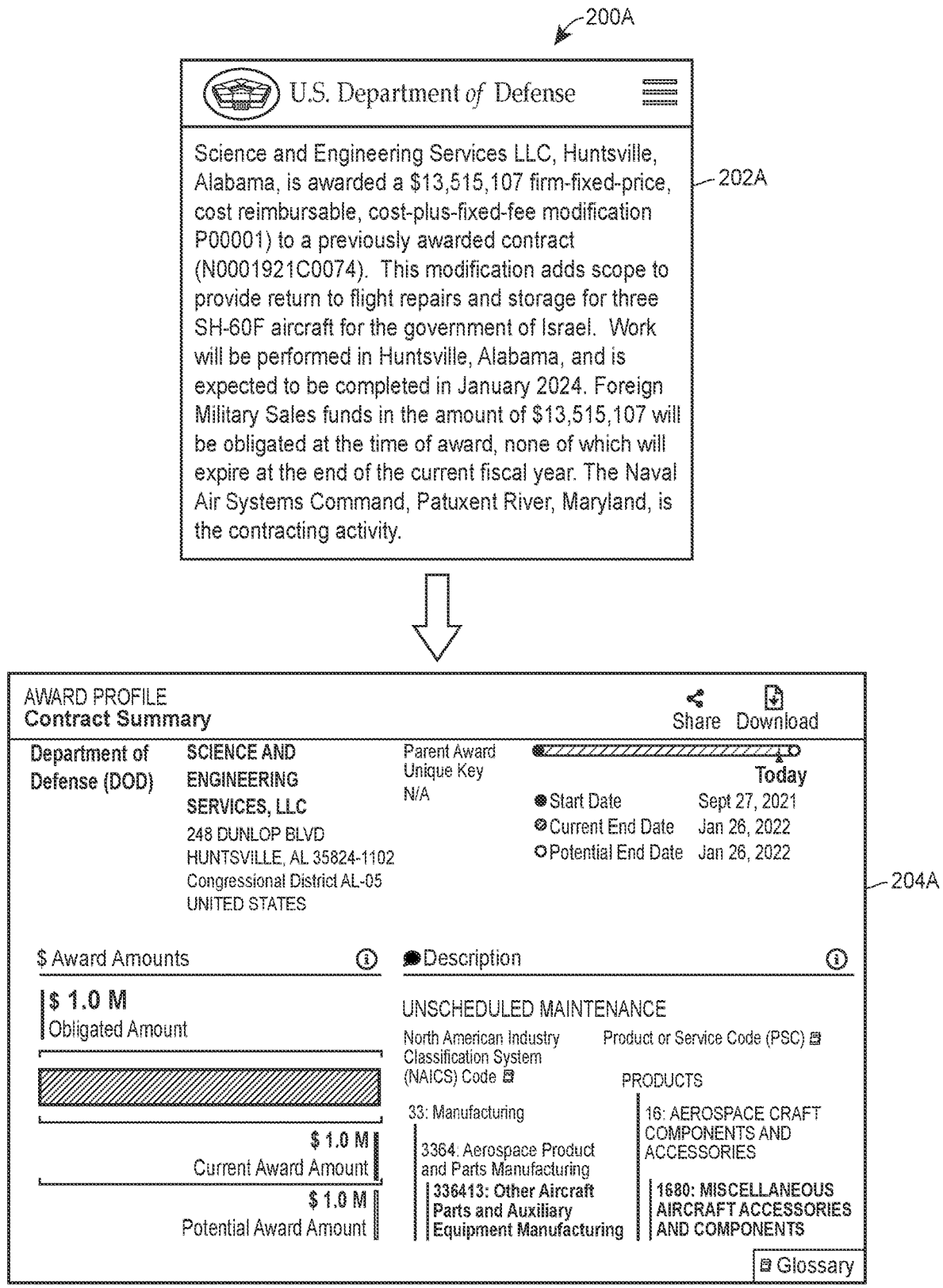
FIG. 2A illustrates a block diagram of one exemplary process for ingesting data based on context data, according to some aspects.

FIG. 2A illustrates a block diagram of one exemplary computer-implemented process 200A for ingesting data based on context data, according to some aspects. The process 200A depicts website text 202A corresponding to context information and/or public data. The process 200A further depicts record data 204A corresponding to record data. At least some of the process 200A may use the computing environment 100 of FIG. 1 and may have been initiated either automatically and/or in response to a request. For example, the process 200A may use (i) the communication routine 196a comprising one or more computer-executable instructions that, when executed, cause a computer system (e.g., the computer system 110) to communicate with the data sources 120-140 via the network 150, and (ii) the data presentation routine 196c comprising one or more computer-executable instructions that, when executed, cause a computer system (e.g., the computer system 110) to generate and/or present received data to the user via the display 162.

The website text 202A may be written by one or more persons who may be writing on behalf of an organization, such as in this illustration, the U.S. Department of Defense. In other examples, the organization may be an individual, a company, an institution, a government, and/or other organizations or entities. The website text 202A may be publicly accessible, not requiring special access credentials to view (e.g., the website text 202A may be accessible to any computer accessing a website corresponding to the website text 202A). In some cases, the website text 202A may be automatically generated, e.g., via an artificial intelligence algorithm or via machine learning.

In one example, the website text 202A may be public data that is ingested by a computer system (which may be the same as or similar to the computer system 110 of FIG. 1) based at least on context information. The website text 202A may have been ingested using the public data application 194b (described above) comprising one or more computer-executable instructions that, when executed, cause a computer system (e.g., the computer system 110) to ingest public data. In this example, the context information may have previously been ingested by the computer system and may include a seed identifier identifying an entity and/or an area of interest. Being that the illustrated website text 202A relates to flight repairs and storage for aircraft for Israel, the previously ingested context information may have related to, for example, one or more of: U.S. aircraft, Israeli aircraft, aircraft repair, aircraft storage, foreign contracts, etc. In response to ingesting the context information, the computer system may have ingested the website text 202A as public data, possibly using a webcrawler. In this example where the website text 202A is the public data, the Department of Defense, the organization providing the website text 202A, may be an information source. The website text 202A may be assigned one or more weights based on: (i) a reliability of the information source, (ii) a relevance of the information source to the context information, (iii) a relevance of an information source to a purchasing organization offering a present contract, or (iv) a frequency of certain words included in text corresponding to the information source. For example, the website text 202A may be given a relatively high weight (compared to other possible instances of public data) because the website text 202A may be from a reliable information source (e.g., the Department of Defense), the information included in the website text 202A may be relevant to the context information and/or the purchasing organization, and/or words used in the website text 202A may be words of interest. The relatively high weight of the website text 202A may mean that data/information gathered from the website text 202A will be given more consideration when generating predicted resource allocation information for the present contract offered by the purchasing organization.

In another example, the website text 202A is not public data, rather the website text 202A may be context information. In this example, the website text 202A may have been ingested by the computer system as context information using the context information application 194a (described above) comprising one or more computer-executable instructions that, when executed, cause a computer system (e.g., the computer system 110) to ingest and process context information including one or more of a seed identifier identifying an entity and/or an area of interest. The website text 202A may have been ingested by the computer system in response to user input, such as a user providing a link to a website hosting the website text 202A or inputting actual text included in the website text 202A. Alternatively, the website text 202A may have been automatically identified and ingested as context information by the computer system. In this case where the website text 202A is context information, not public data, no weight may be assigned to the website text 202A.

In response to ingesting the website text 202A (whether the website text 202A corresponds to public data and/or context information), the computer system may identify information within the website text 202A to enable ingesting of additional data and/or information. For example, as illustrated, the website text 202A includes a contract identification, "N0001921C0074," which may be identified via a webcrawler. Once identifying the contract identification, the computer system may ingest additional data and/or information based on the contract information, such as a contract summary 204A, as illustrated.

The contract summary 204A may be record data which may be ingested by the computer system (which may be the same as or similar to the computer system 110 of FIG. 1), based at least on context information. The contract summary 204A may have been ingested using the record data application 194c (described above) comprising one or more computer-executable instructions that, when executed, cause a computer system (e.g., the computer system 110) to ingest record data. The contract summary 204A may include a contract corresponding to the contract identification included in the website text 202A. The contract summary 204A may be publicly-accessible, such as through an organization's spending records. As illustrated, the contract summary 204A is accessible at the U.S. Government's spending record website, USASPENDING.GOV, and is locatable within the website via the contract identification. Although illustrated as publicly-accessible, in other examples, record data may not be publicly-accessible and may be private to an organization.

The contract summary 204A, and accordingly the record data, may include one or more records corresponding to an organization, the organization being the Department of Defense of the U.S. Government, as illustrated. The contract summary 204A, and accordingly the record data, may include information relating a purchasing organization (the Department of Defense, as illustrated) such as the purchasing organization's name, address, summary of the organization, etc. The contract summary 204A, and accordingly the record data, may include information related to a providing organization (Science and Engineering Services, LLC, as illustrated) such as the purchasing organization's name, address, summary of the organization, etc. The contract summary 204A, and accordingly the record data, may include information relating to a contract, such as a start date/time, an end date/time, a value (e.g., dollar value of the present contract), a description of a good or service being provided, a classification, etc. The contract summary 204A, and accordingly the record data, may have some formatting included beyond just plain text; for example, paragraph breaks, bolding, underlining, italicizing, highlighting, or other formatting included. The contract summary 204A, and accordingly the record data, may further include one or more of: images and/or videos, specifications, ratings, and other information. In some aspects, the contract summary 204A, and accordingly the record data, have may been auto-generated. There may be limits on which words, phrases, images and/or videos are allowed and/or disallowed from being ingested by the computer system.

The contract summary 204A, and accordingly the record data, may correspond to one or more historical contracts offered by a purchasing organization which are ongoing (i.e., one or more providing organizations have already been selected for the one or more historical contracts, but the one or more historical contracts are not yet at completion) and/or have already been completed (i.e., both the purchasing organization and the one or more providing organizations have each upheld and completed their responsibilities under the one or more historical contracts). The one or more historical contracts may not be the same as the present contract for which predicated resource allocation information is to be generated. While the one or more historical contracts may not be the same as the present contract, the one or more historical contracts may nonetheless be related to the present contract such that information/data corresponding to the one or more historical contracts may inform the generation of predicated resource allocation information for the present contract. Furthermore, the one or more historical contracts may have been offered by the same purchasing organization as the present contract (e.g., for both the one or more historical contracts and the present contract the U.S. Government is the purchasing organization). It is worth noting that the purchasing organizations for the one or more historical contracts and the present contract may be referred to herein as the same if they are part of a common larger organization (e.g., the U.S. Air Force and the U.S. National Security Agency are both under the U.S. Government, accordingly, a contract from one may serve as a historical contract for a present contract offered by the other). Alternatively, the one or more historical contracts may have been offered by different purchasing organization(s) as the purchasing organization offering the present contract.

The contract summary 204A, and accordingly the record data including one or more records, may be assigned one or more weights based on: (i) a relevance of the one or more records to the context information, (ii) a relevance of the one or more records to the purchasing organization of the present contract, or (iii) a frequency of certain words included in text corresponding to the one or more records. For example, the contract summary 204A may be given a relatively high weight (compared to other possible instances of record data) because the contract summary 204A may include records that may be relevant to the context information and/or the purchasing organization, and/or words used in the contract summary 204A may be words of interest. The relatively high weight of the website text 202A may mean that data/information gathered from the website text 202A will be given more consideration when generating predicted resource allocation information for a related contract offered by the purchasing organization.

While the process 200A depicts only one instance of public data/context information (e,g., website text 202A) and one instance of record data (contract summary 204A), it should be understood that any number of instances of public data, context information, and record data may be included. For example, after ingesting the website text 202A, the computer system may also ingest additional sources of information or data, such as additional instances of public data (e.g., news sites, social media sites, blog sites, etc.). Any additional instances of public data and/or record data may each be assigned one or more weights for use in generating the predicted resource allocation information for the present contract. Additionally, in response to ingesting the additional instances of public data and/or record data, weights already assigned to previously ingested data (e.g., the one or more weights assigned to the contract summary 204A) may be dynamically updated.

Exemplary Data Ingestion

Figure 2B:
FIG. 2B illustrates a block diagram of another exemplary process for ingesting data based on context data, according to some aspects.
Figures 2, 2C:
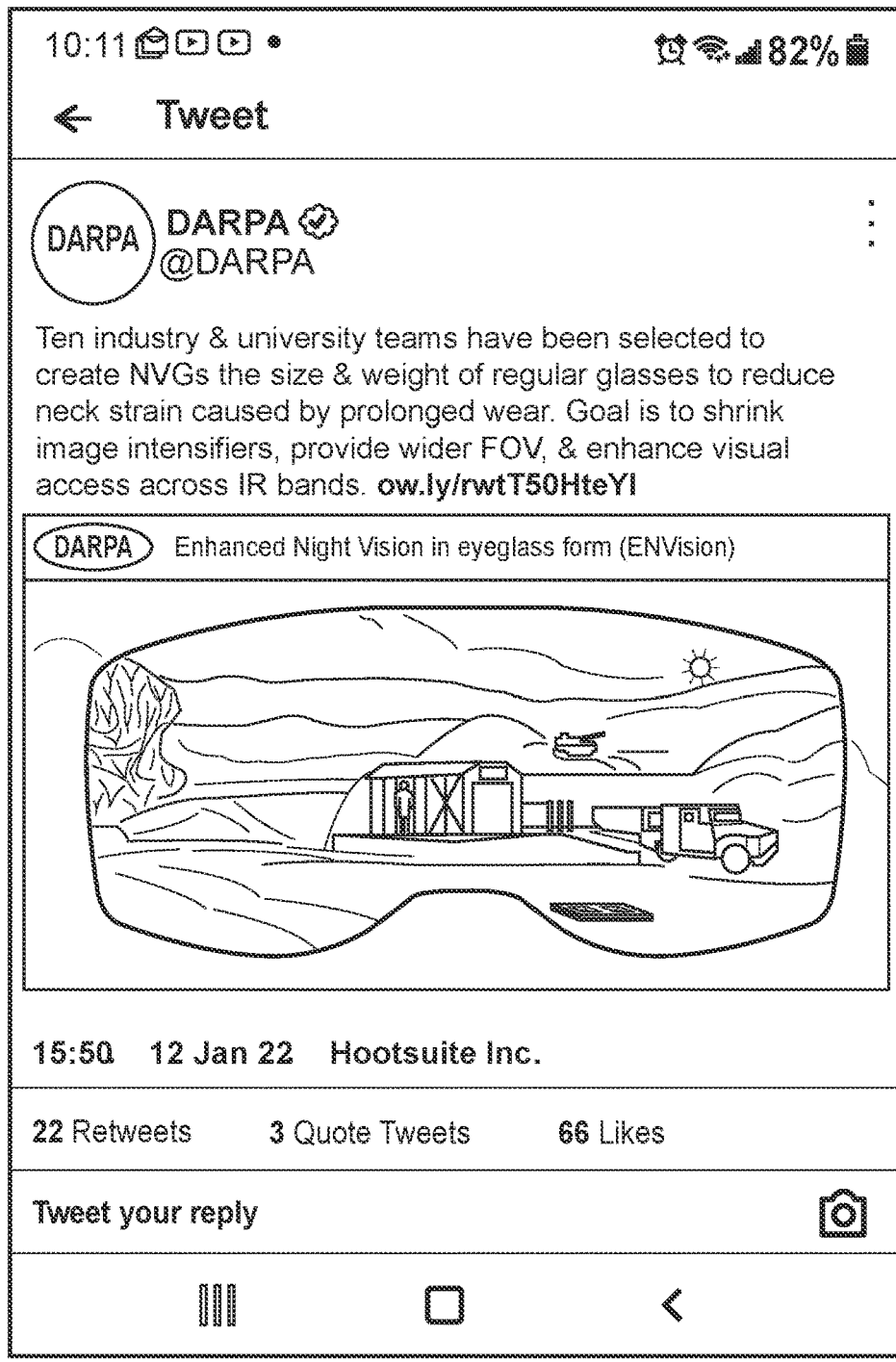
Figures 2, 2C, 3:
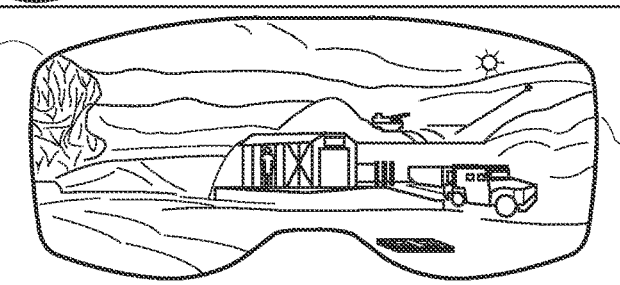

FIG. 2B illustrates a block diagram of another exemplary process 200B for ingesting data based on context data. The process 200B depicts a first social media post 202B corresponding to context information and/or public data. The process 200B further depicts a second social media post 204B corresponding to public data. At least some of the process 200B may use the computing environment 100 of FIG. 1 and may have been initiated either automatically and/or in response to a request. For example, the process 200B may use (i) the communication routine 196a comprising one or more computer-executable instructions that, when executed, cause a computer system (e.g., the computer system 110) to communicate with the data sources 120-140 via the network 150, and (ii) the data presentation routine 196c comprising one or more computer-executable instructions that, when executed, cause a computer system (e.g., the computer system 110) to generate and/or present received data to the user via the display 162.

The first social media post 202B may be written by one or more persons who may be writing on behalf of an organization, or, as in this illustration, an individual, namely, General Paul M. Nakosone of Cyber Command. In other examples, the organization may be an individual, a company, an institution, a government, and/or other organizations or entities. The first social media post 202B may be publicly accessible, not requiring special access credentials to view (e.g., the first social media post 202B may be accessible to any computer accessing a website corresponding to the first social media post 202B).

In one example, the first social media post 202B may be public data that is ingested by a computer system (which may be the same as or similar to the computer system 110 of FIG. 1) based at least on context information. The first social media post 202B may have been ingested using the public data application 194b (described above) comprising one or more computer-executable instructions that, when executed, cause a computer system (e.g., the computer system 110) to ingest public data. In this example, the context information may have previously been ingested by the computer system and may include a seed identifier identifying an entity and/or an area of interest. Being that the first social media post 202B relates to cybersecurity programs in higher education, the previously ingested context information may have related to, for example, one or more of: government-sponsored higher education programming, cybersecurity technology, cybersecurity programming and training, etc. In response to ingesting the context information, the computer system may have ingested the first social media post 202B as public data, possibly using a webcrawler. In this example where the first social media post 202B is the public data, General Nakosone, the individual authoring the first social media post 202B, may be an information source. The first social media post 202B may be assigned one or more weights based on: (i) a reliability of the information source, (ii) a relevance of the information source to the context information, (iii) a relevance of the information source to a purchasing organization offering a present contract, or (iv) a frequency of certain words included in text corresponding to the information source. For example, the first social media post 202B may be given a relatively high weight (compared to other possible instances of public data) because the first social media post 202B may be from a reliable information source (e.g., the official and verified Twitter account of General Nakosone), the information included in the first social media post 202B may be relevant to the context information and/or the purchasing organization, and/or words used in the first social media post 202B may be words of interest. The relatively high weight of the first social media post 202B may mean that data/information gathered from the first social media post 202B will be given more consideration when generating predicted resource allocation information for the present contract offered by the purchasing organization.

In another example, the first social media post 202B is not public data, rather the first social media post 202B may be context information. In this example, the first social media post 202B may have been ingested by the computer system as context information using the context information application 194a (described above) comprising one or more computer-executable instructions that, when executed, cause a computer system (e.g., the computer system 110) to ingest and process context information including one or more of a seed identifier identifying an entity and/or an area of interest. The first social media post 202B may have been ingested by the computer system in response to user input, such as a user providing a link to a website hosting the first social media post 202B or inputting actual text included in the first social media post 202B. Alternatively, the first social media post 202B may have been automatically identified and ingested as context information by the computer system. In this case where the first social media post 202B is context information, not public data, no weight may be assigned to the first social media post 202B.

In response to ingesting the first social media post 202B (whether the first social media post 202B corresponds to public data and/or context information), the computer system may identify information within the first social media post 202B to enable ingesting of additional data and/or information. For example, as illustrated, the first social media post 202B includes a hyperlinked hashtag identification, "#HigherEducationDay," which may be identified via a webcrawler. Once identifying the hyperlink, the computer system may ingest additional data and/or information based on the hyperlink, such as ingesting additional social media postings using the same hashtag, like a second social media post 204B, as illustrated.

The second social media post 204B may be public data which may be ingested by the computer system (which may be the same as or similar to the computer system 110 of FIG. 1), based at least on context information. The second social media post 204B may be written by one or more persons who may be writing on behalf of an organization such as an individual, a company, an institution, a government, and/or other organizations or entities. The second social media post 204B may be publicly accessible, not requiring special access credentials to view (e.g., the second social media post 204B may be accessible to any computer accessing a website corresponding to the second social media post 204B). The second social media post 204B may be public data that is ingested by a computer system (which may be the same as or similar to the computer system 110 of FIG. 1) based at least on context information. The second social media post 204B may have been ingested using the public data application 194b (described above) comprising one or more computer-executable instructions that, when executed, cause a computer system (e.g., the computer system 110) to ingest public data. The context information may have previously been ingested by the computer system and may include a seed identifier identifying an entity and/or an area of interest. As illustrated, the information source is Federal Student Aid and the second social media post 204B is of little relevance to the context information of one or more of: government-sponsored higher education programming, cybersecurity technology, cybersecurity programming and training, etc. This example illustrates that even with the context information and/or public data of the first social media post 202B, it is possible for "sidetracking" to occur when such large and diverse amounts of data are ingested. To address this problem, just as may be done for all public data, the second social media post 204B may be assigned one or more weights based on: (i) a reliability of the information source, (ii) a relevance of the information source to the context information, (iii) a relevance of the information source to a purchasing organization offering a present contract, or (iv) a frequency of certain words included in text corresponding to the information source. The second social media post 204B may be given a relatively low weight (compared to other possible instances of public data) because although the second social media post 204B may be from a reliable information source (e.g., the official and verified Twitter account of Federal Student Aid), the information included in the second social media post 204B may be of little relevance to the context information and/or the purchasing organization, and/or words used in the second social media post 204B may be words of little to no interest. The relatively low weight of the second social media post 204B may mean that data/information gathered from the second social media post 204B will be given less consideration (possibly even no consideration, if for example, a minimum weight threshold is used) when generating predicted resource allocation information for the present contract offered by the purchasing organization.

In one aspect, after being "sidetracked" following the "#HigherEducationDay" hashtag and arriving at the second social media post 204B, the process 200B may "backtrack," returning to either the last instance of public data which was determined to be more relevant (e.g., have one or more weights at least equal to a certain threshold) or the context information. For example, the process 200B may "backtrack" to the first social media post 202B and instead identify the retweeted official and verified Twitter of the NSA/CSS included in the first social media post 202B. In this example, social media posts from the NSA/CSS Twitter Account may be subsequently ingested.

While the process 200B depicts only ingesting of two social media posts (the first social media post 202B and the second social media post 204B) as context information and/or public data it should be understood that any number of additional instances of public data, context information, and record data may be included. In one example, after ingesting the second social media post 204B, the computer system may also ingest additional record data (e.g., records relating to historical contracts for the U.S. Government, records relating to historical contracts for a private company, etc.). Any additional instances of public data and/or record data may each be assigned one or more weights for use in generating the predicted resource allocation information for the present contract. Additionally, in response to ingesting the additional instances of public data and/or record data, weights already assigned to previously ingested data (e.g., the one or more weights assigned to the first social media post 202B and the one or more weights assigned to the second social media post 204B) may be dynamically updated.

Exemplary Data Ingestion

FIG. 2C-1, FIG. 2C-2, and FIG. 2C-3 illustrate a block diagram of one exemplary process 200C for ingesting data based on context data. The process 200C depicts a contract summary 202C corresponding to context information and/or record data. The process 200C further depicts a social media post 204C corresponding to public data. The process 200C further depicts website text 206C corresponding to record data. At least some of the process 200C may use the computing environment 100 of FIG. 1 and may have been initiated either automatically and/or in response to a request. For example, the process 200C may use (i) the communication routine 196a comprising one or more computer-executable instructions that, when executed, cause a computer system (e.g., the computer system 110) to communicate with the data sources 120-140 via the network 150, and (ii) the data presentation routine 196c comprising one or more computer-executable instructions that, when executed, cause a computer system (e.g., the computer system 110) to generate and/or present received data to the user via the display 162.

The contract summary 202C may be publicly-accessible, such as through an organization's spending records. As illustrated, the contract summary 206C is accessible at the U.S. Government's spending record website, USASPENDING.GOV, and is filterable, for example, using company name and project information. Although illustrated as publicly-accessible, in other examples, the contract summary 202C not be publicly-accessible and may be private to an organization. The contract summary 202C may include one or more records corresponding to an organization, the organization being the Department of Defense of the U.S. Government, as illustrated. The contract summary 202C may include information relating a purchasing organization (the Department of Defense, as illustrated) such as the purchasing organization's name, address, summary of the organization, etc. The contract summary 202C may include information related to a providing organization (RAY- THEON BBN TECHNOLOGIES CORP., as illustrated) such as the purchasing organization's name, address, summary of the organization, etc. The contract summary 202C may include information relating to a contract, such as a start date/time, an end date/time, a value (e.g., dollar value of the present contract), a description of a good and/or service being provided, a classification, etc. The contract summary 202C may have some formatting included beyond just plain text; for example, paragraph breaks, bolding, underlining, italicizing, highlighting, and/or other formatting included. The contract summary 202C may further include one or more of: images and/or videos, specifications, ratings, and other information. In some aspects, the contract summary 202C have may been auto-generated. There may be limits on which words, phrases, images, and/or videos are allowed and/or disallowed from being ingested by the computer system.

The contract summary 202C may correspond to one or more historical contracts offered by a purchasing organization which is ongoing (i.e., one or more providing organizations have already been selected for the one or more historical contracts, but the one or more historical contracts are not yet at completion) and/or have already been completed (i.e., both the purchasing organization and the one or more providing organizations have each upheld and completed their responsibilities under the one or more historical contracts). The one or more historical contracts may not be the same as the present contract for which predicated resource allocation information is to be generated. While the one or more historical contracts may not be the same as the present contract, the one or more historical contracts may nonetheless be related to the present contract such that information/data corresponding to the one or more historical contracts may inform the generation of predicated resource allocation information for the present contract.

In one example, the contract summary 202C may be record data that is ingested by a computer system (which may be the same as or similar to the computer system 110 of FIG. 1) based on context information. The contract summary 202C may have been ingested using the record data application 194c (described above) comprising one or more computer-executable instructions that, when executed, cause a computer system (e.g., the computer system 110) to ingest record data. In this example, the context information may have previously been ingested by the computer system and may include a seed identifier identifying an entity and/or an area of interest. Being that the contract summary 202C relates to military glasses and vision technology, the previously ingested context information may have related to, for example, one or more of: nightvision, military vision, personal optics, etc. In response to ingesting the context information, the computer system may have ingested the contract summary 202C as record data, possibly using a webcrawler. In this example, where the contract summary 202C is record data, the one or more historical contracts included in the contract summary 202C may have been offered by the same purchasing organization as the present contract (e.g., for both the one or more historical contracts and the present contract the U.S. Government is the purchasing organization). It is worth noting that the purchasing organizations for the one or more historical contracts and the present contract may be referred to herein as the same if they are part of a common larger organization (e.g., the U.S. Air Force and the U.S. National Security Agency are both under the U.S. Government, accordingly, a contract from one may serve as a historical contract for a present contract offered by the other). Alternatively, the one or more historical contracts may have been offered by different purchasing organization(s) as the purchasing organization offering the present contract. Furthermore, in this example where the contract summary 202C is record data, the contract summary 202C, and accordingly the record data including one or more records, may be assigned one or more weights based on: (i) a relevance of the one or more records to the context information, (ii) a relevance of the one or more records to the purchasing organization of the present contract, or (iii) a frequency of certain words included in text corresponding to the one or more records. For example, the contract summary 202C may be given a relatively high weight (compared to other possible instances of record data) because the contract summary 202C may include records that may be relevant to the context information and/or the purchasing organization, and/or words used in the contract summary 202C may be words of interest. The relatively high weight of the contract summary 202C may mean that data/information gathered from the contract summary 202C will be given more consideration when generating predicted resource allocation information for a related contract offered by the purchasing organization.

In another example, the contract summary 202C is not record data, rather the contract data 202C may be context information. In this example, the contract summary 202C may have been ingested by the computer system as context information using the context information application 194a (described above) comprising one or more computer-executable instructions that, when executed, cause a computer system (e.g., the computer system 110) to ingest and process context information including one or more of a seed identifier identifying an entity and/or an area of interest. The contract information 202C may have been ingested by the computer system in response to user input, such as a user providing a link to a website hosting the contract summary 202C or inputting actual text included in the contract summary 202C. Alternatively, the contract information 202C may have been automatically identified and ingested as context information by the computer system. In this case where the contract summary 202C is context information, not record data, no weight may be assigned to the contract data 202C.

In response to ingesting the contract summary 202C (whether the contract summary 202C corresponds to context information and/or record data), the computer system may identify information within the contract summary 202C to enable ingesting of additional data and/or information. For example, the company names (e.g., RAYTHEON BBN TECHNOLOGIES CORP., as illustrated) and/or the contract description (e.g., "THE PRIMARY GOAL OF THIS ENVISION EFFORT IS TO DRAMATICALLY REDUCE THE SIZE AND WEIGHT OF NIGHT VISION GOGGLES INTO AN EYEGLASS FORM FACTOR WITH DRASTICALLY IMPROVED SENSITIVITY, NOISE REDUCTION AND SPEED," as illustrated) may be identified by the webcrawler. Once identifying the companies involved and the contract description, the computer system may ingest additional data and/or information, such as a social media post 204C, as illustrated.

The social media post 204C may be public data that is ingested by the computer system (which may be the same as or similar to the computer system 110 of FIG. 1), based at least on context information. The social media post 204C may have been ingested using the public data application 194b comprising one or more computer-executable instructions that, when executed, cause a computer system (e.g., the computer system 110) to ingest public data. The social media post 204C may be written by one or more persons who may be writing on behalf of an organization, as in this illustration, DARPA. In other examples, the organization may be an individual, a company, an institution, a government, and/or other organizations or entities. The social media post 204C may be publicly accessible, not requiring special access credentials to view (e.g., the social media post 204C may be accessible to any computer accessing a website corresponding to the social media post 204C). The social media post 204C may be assigned one or more weights based on: (i) a reliability of the information source, (ii) a relevance of the information source to the context information, (iii) a relevance of the information source to a purchasing organization offering a present contract, or (iv) a frequency of certain words included in text corresponding to the information source. For example, the social media post 204C may be given a relatively high weight (compared to other possible instances of public data) because the social media post 204C may be from a reliable information source (e.g., the official and verified Twitter account of DARPA), the information included in the social media post 204C may be relevant to the context information and/or the purchasing organization, and/or words used in the social media post 204C may be words of interest. The relatively high weight of the social media post 204C may mean that data/information gathered from the social media post 204C will be given more consideration when generating predicted resource allocation information for the present contract offered by the purchasing organization.

In response to ingesting the social media post 204C, the computer system may identify information within the social media post 204C to enable ingesting of additional data and/or information. For example, as illustrated, the social media post 204C includes a hyperlink, "ow.ly/rwtT50HteYI" which may be identified via a webcrawler. Once identifying the hyperlink, the computer system may ingest additional data and/or information based on the hyperlink, such as website text 206C, as illustrated.

The website text 206C may be public data that is ingested by the computer system, based at least on context information (which may be the same as or similar to the computer system 110 of FIG. 1). The website text 206C may have been ingested using the public data application 194b comprising one or more computer-executable instructions that, when executed, cause a computer system (e.g., the computer system 110) to ingest public data. The website text 206C may be written by one or more persons who may be writing on behalf of an organization such as an individual, a company, an institution, a government, and/or other organizations or entities. The website text 206C may be publicly accessible, not requiring special access credentials to view (e.g., the website text 206C may be accessible to any computer accessing a website corresponding to the website text 206C). The website text 206C may be public data that is ingested by a computer system based on context information. The context information may have previously been ingested by the computer system and may include a seed identifier identifying an entity and/or an area of interest. The website text 206C may be assigned based on one or more weights based on: (i) a reliability of the information source, (ii) a relevance of the information source to the context information, (iii) a relevance of the information source to a purchasing organization offering a present contract, or (iv) a frequency of certain words included in text corresponding to the information source. The website text 206C may be given a relatively high weight (compared to other possible instances of public data) because the website text 206C may be from a reliable information source (e.g., the website of DARPA), the information included in the website text 206C may be of relevance to the context information and/or the purchasing organization, and/or words used in the website text 206C may be words of interest. The relatively high weight of the website text 206C may mean that data/information gathered from the website text 206C will be given more consideration when generating predicted resource allocation information for the present contract offered by the purchasing organization.

While the process 200C depicts only ingesting of one instance of context information and/or record data (the contract summary 202C) and two instances of public data (the social media post 204C and the website text 206C), it should be understood that any number of additional instances of public data, context information, and record data may be included. For example, after ingesting the contract summary 202C, the computer system may also ingest additional sources of information or data, such as additional instances of record data (e.g., other contract records of U.S. Government spending, etc.). Any additional instances of public data and/or record data may each be assigned one or more weights for use in generating the predicted resource allocation information for the present contract. Additionally, in response to ingesting the additional instances of public data and/or record data, weights already assigned to previously ingested data (e.g., the one or more weights assigned to the website text 206C) may be dynamically updated.

Exemplary Computer-Implemented Machine Learning Models for Data Ingestion

It will be appreciated that any of processes 200A, 200B, and/or 200C may include training and using a machine learning model to identify valuable information/data and determine weights corresponding thereto. It is also to be noted that a machine learning the same as or similar to those described corresponding to processes 200A, 200B, and/or 200C, may be used for additional purposes, including being used in (i) normalizing public data and record data, and (ii) generating predicted resource allocation information. The machine learning model may be trained using a supervised and/or unsupervised machine learning program and/or algorithm. The machine learning program and/or algorithm may employ a neural network, which may be a convolutional neural network, a deep learning neural network, and/or a combined learning module and/or program that learns in two or more features and/or feature datasets in a particular areas of interest. In one aspect, a generative adversarial neural network may be used. The machine learning programs and/or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data in order to facilitate making predictions for subsequent data. In some aspects, due to the processing power requirements of training machine learning models, the selected model may be trained using additional computing resources (e.g., cloud computing resources) based upon data provided by a server (not shown). A training data set may include public data, record data, and/or context data. For example, if the algorithm is being trained for use in identifying valuable social media posts, the training data may include examples of valuable and not-valuable social media posts. The training data set may be unlabeled, and/or the training data set may be labeled, such as by a human.

Training of the algorithm may continue until at least one model of the algorithm is validated and meets criteria to be used as a model for identifying valuable data/information. In one aspect, an algorithm may be validated using a second subset of the training data set to determine algorithm accuracy and robustness. Such validation may include applying the algorithm to the training data set of the second subset of training data set to predict weights of some instances of public data and/or record data. The algorithm may then be evaluated to determine whether the algorithm performance is sufficient based upon the validation stage predicted weights. The sufficiency criteria applied may vary depending upon the size of the training data set available for training, the performance of previous iterations of algorithms, and/or user-specified performance requirements. In another aspect, the algorithm may be validated using feedback. In some aspects, the feedback may be user feedback. The user feedback may include asking a user if instances of public data and/or record data receiving a high weight from the trained model are valuable. When an algorithm has not achieved sufficient performance, additional training may be performed, which may include refinement of the algorithm and/or retraining on a different first subset of the training data set, after which the new algorithm may again be validated and assessed. When the algorithm has achieved sufficient performance, the algorithm may be stored for later use. The algorithms may be stored as sets of parameter values and/or weights for analysis of further user interaction data and/or user data, which may also include analysis logic and/or indications of model validity in some instances.

Exemplary Predicted Resource Allocation Information Generation

Figure 3A:
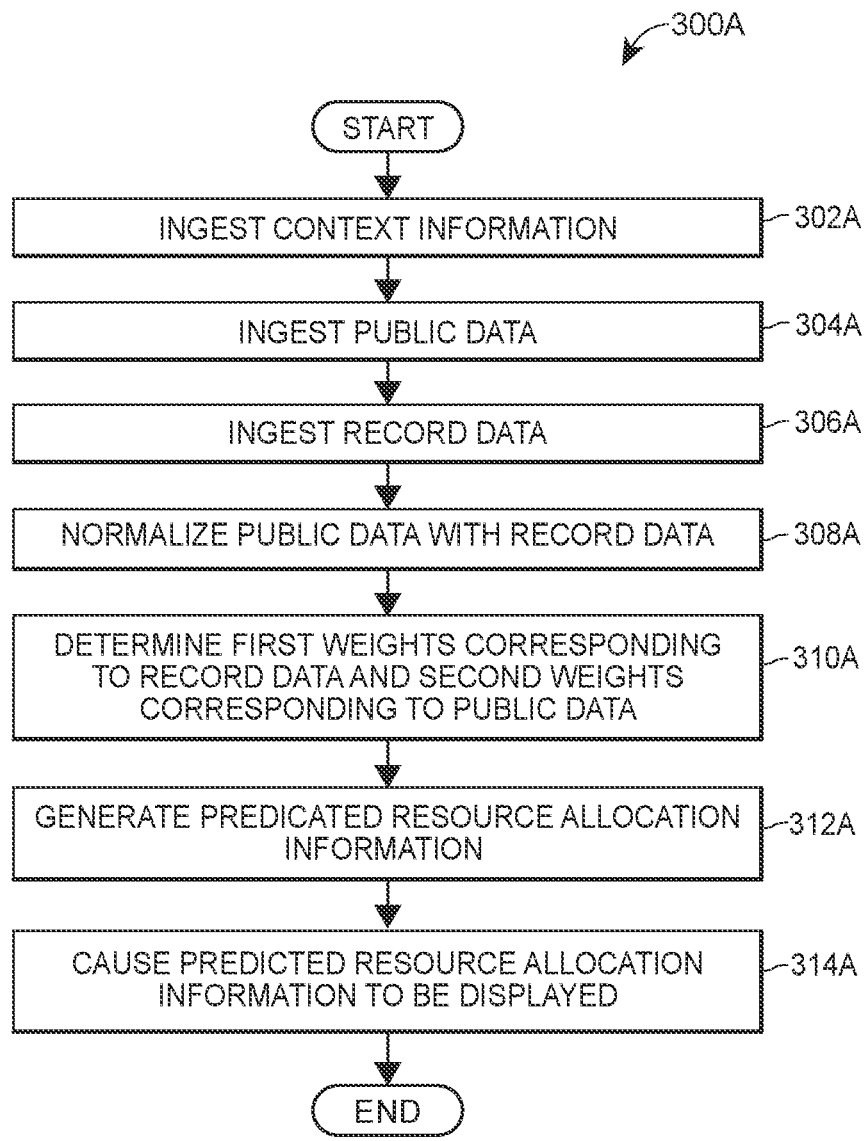
FIG. 3A illustrates a flow diagram of an exemplary method for generating predicted resource allocation information of an organization, according to some aspects.

FIG. 3A illustrates a flow diagram of an exemplary computer-implemented method 300A for generating predicted resource allocation information of an organization. The method 300A includes ingesting context information (block 302A), ingesting public data (block 304A), ingesting record data (306A), normalizing public data with record data (308A), determining first weights corresponding to the record data and the second set of weights corresponding to the public data (block 310A), generating predicted resource allocation information (block 312A), and causing the predicated resource allocation information to be displayed (block 314A). At least some of the method 300A may use the computing environment 100 of FIG. 1. At least some of the method 300A may be the same as or similar to the processes illustrated in FIGS. 2A-2C, including, for example, the processes of ingesting context information, ingesting public data, ingesting record data, and/or determining first weights corresponding to the record data and second set of weights corresponding to the public data.

The method 300A may begin, in some aspects, with ingesting context information (block 302A). The context information may have been provided by the context information data source 140 to the computer system 110 via the network 150. At block 302A, the computer system 110 may ingest the context information which may be similar to, for example, the website text 202A and/or the contract summary 202C. The context information may include one or more of (i) a seed identifier identifying an entity or (ii) an area of interest. A seed identifier may include, for example, one or more of: a hyperlink or URL/web address, text, an image, etc., identifying an entity, which may be, for example, one or more of: a person, a website (or subset of a website, e.g., one or more webpages), an organization (e.g., a company, a government, a club or group, etc.), an information source, etc. An area of interest may include one or more of: a technical area (e.g., engineering area, a scientific area, etc.), a market area (e.g., a market segment, customer base, a product type, etc.), an industry, a contract type (e.g., small/mid/large cap projects, short-term/long-term projects, fixed fee/variable fee contracts, commission model, etc.), or other relevant/suitable considerations an organization may have when generating predicted resource allocation information. In some aspects, ingesting the context information may include parsing and/or interpreting the context information via, applying a natural language processing model to the context information. The natural language processing model may be a machine learning model. Such natural language processing may include identifying words, phrases, and/or groups of words sharing common attributes, such as root, general meanings, formatting, sentence structure, etc. Ingesting the context information may have been initiated either automatically, and/or in response to a request. The request may have originated from the computer system 110, for example, due to the user of the computer system 110 requesting the computer system to ingest the context information. The context information may have been provided to the computer system 110 via user input (e.g., the user providing one or more keywords associated with an area of interest), or may be initiated automatically (the computer system 110 automatically initiates ingesting of context information related to an area of interest without a user requesting the computer system 110 to do so). The context information may be stored by a server and/or database (neither illustrated), or one or more of: the RAM 184, the MPs 182, or the data storage 192 of the computer system 110.

At block 304A, public data may be ingested. The public data may have been provided by the public data source 130 to the computer system 110 via the network 150. At block 304A, the computer system 110 may ingest the public data which may be similar to, for example, the website text 202A and/or the second social media post 204B. The public data may include a one or more information sources. The one or more information sources, may include, for example, one or more of: social media information, news information, blog information, or other publicly-accessible data. The public data may be in the form of one or more of: a webpage, a website, a webaddress, text, an image, a video, audio, printed material, a chart, a table, a plot, a graph, a map, a diagram, a histogram, etc. The public data may be publicly-accessible. The public data may be accessible to certain entities. The public data may include structured and/or unstructured data. In some aspects, ingesting the public data may include parsing and/or interpreting the public data via, applying a natural language processing model to the public data. The natural language processing model may be a machine learning model. Such natural language processing may include identifying words, phrases, and/or groups of words sharing common attributes, such as root, general meanings, formatting, sentence structure, etc. Ingesting the public data may have been initiated automatically, such as, in response to ingesting other data and/or information; this may be referred to as "automatically-ingested public data." One example of automatically-ingested public data may include, for example the second social media post 204B, which was ingested in response to ingesting the first social media post 202B. Alternatively, the public data may be ingested manually, such as from a user providing public data in the form of one or more of: a webpage, a website, a webaddress, text, an image, a video, audio, printed material, a chart, a table, a plot, a graph, a map, a diagram, a histogram, etc. This may be referred to as "manually-ingested public data." The user may have provided the manually-ingested public data to a computer system (e.g., the computer system 110) via inputs (e.g., inputs 166). The public data may be stored by a server and/or database (neither illustrated), or one or more of: the RAM 184, the MPs 182, or the data storage 192 of the computer system 110.

At block 306A, record data may be ingested. The record data may have been provided by the record data source 120 to the computer system 110 via the network 150. At block 306A, the computer system 110 may ingest the record data which may be similar to, for example, the contract summary 204A and/or the contract summary 202C. The record data may include a one or more records corresponding to an organization. The organization may be a purchasing organization. In one example, the records may correspond to one or more historical contracts of the purchasing organization which are ongoing (i.e., one or more providing organizations have already been selected for the one or more historical contracts, but the one or more historical contracts is not yet at completion) and/or have already been completed (i.e., both the purchasing organization and the one or more providing organizations have each upheld and completed their responsibilities under the one or more historical contracts). The one or more historical contracts may not be the same as a present contract for which predicated resource allocation information is to be generated. While the one or more historical contracts may not be the same as the present contract, the one or more historical contracts may nonetheless be related to the present contract such that information/data corresponding to the one or more historical contracts may inform the generation of predicated resource allocation information for the present contract. In one example, the one or more historical contracts may have been offered by the same purchasing organization as the present contract. In another example, the one or more historical contracts may have been offered by different purchasing organization(s) as the purchasing organization offering the present contract. The record data may be in the form of one or more of: a webpage, a website, a webaddress, text, an image, a video, audio, printed material, a chart, a table, a plot, a graph, a map, a diagram, a histogram, etc. The record data may be publicly-accessible. The record data may be accessible to certain entities. The record data may be private. The record data may include structured and/or unstructured data. Included in the record data may be information corresponding to the one or more records, such as one or more of: total dollars obligated, base and exercised options value, current total value of award, base and all options value, potential total value of award, or other suitable financial information corresponding to the records. In some aspects, ingesting the record data may include parsing and/or interpreting the record data via, applying a natural language processing model to the record data. The natural language processing model may be a machine learning model. Such natural language processing may include identifying words, phrases, and/or groups of words sharing common attributes, such as root, general meanings, formatting, sentence structure, etc. Ingesting the record data may have been initiated automatically, such as, in response to ingesting other data and/or information; this may be referred to as "automatically-ingested record data." One example of automatically-ingested record data may include, for example the contract summary 204A, which was ingested in response to ingesting the website text 202A. Alternatively, the record data may be ingested manually, such as from a user providing record data in the form of one or more of: a webpage, a website, a webaddress, text, an image, a video, audio, printed material, a chart, a table, a plot, a graph, a map, a diagram, a histogram, etc. This may be referred to as "manually-ingested record data." The user may have provided the manually-ingested record data to a computer system (e.g., the computer system 110) via inputs (e.g., inputs 166). The record data may be stored by a server and/or database (neither illustrated), or one or more of: the RAM 184, the MPs 182, or the data storage 192 of the computer system 110.

At block 308A, the public data may be normalized with the record data. The normalization may be universal, (i.e., applicable to all data/information in all circumstances) or the normalization may be more specific (i.e., different for different data/information and/or different circumstances). Note that the public data and the record data may be referred to herein as "the two datasets." Normalizing the two datasets may include "cleaning" the public data and/or the private data which may be an important step for standardizing the two datasets. Normalizing language/terminology of the two datasets may include standardizing acronyms, synonyms, spelling, spacing, capitalization, slang, industry terms, etc. For example, if a first instance of data in either of the two datasets uses the term "DoD," a second instance of data in either of the two datasets uses the term "Dept. of Defence," and a third instance of data in either of the two datasets uses the term "U.S. Department of Defense," one or more of the three terms may be normalized such that they are interpreted as all being the same or similar in meaning. Normalizing for language/terminology may use a machine learning model such as natural language processing which may include identifying words, phrases, and/or groups of words sharing common attributes, such as root, general meanings, formatting, sentence structure, etc. In other examples, normalizing the two datasets may include normalizing different data types. For example, it may be desirable to be able to relate, and accordingly normalize, text of a first instance of data in either of the two datasets with an image of a second instance of data in either of the two datasets. Normalizing image data, video, and/or audio data may include using machine learning and computer vision techniques, such as object or speech recognition. The normalized record data and/or the normalized public data may be stored by a server and/or database (neither illustrated), or one or more of: the RAM 184, the MPs 182, or the data storage 192 of the computer system 110.

At block 310A, a first set of weights corresponding to the record data and a second set of weights corresponding to the public data may be determined. The first set of weights and the second set of weights may affect how instances of data from the two datasets are considered in generating predicted resource allocation information. For example, as previously described, the second set of weights corresponding to the second social media post 204B may be determined as being lower than other instances of public data, accordingly, the second social media post 204B may be given less consideration in generating predicted resource allocation information than the other instances of public data. The second set of weights corresponding to the public data, which includes one or more information sources, may be determined based on one or more of: (i) a reliability of each of the one or more information sources, (ii) a relevance of each of the one or more information sources to the context information, (iii) a relevance of each of the one or more information sources to the organization, or (iv) a frequency of certain words included in text corresponding to each of the one or more information sources. The first set of weights corresponding to the record data, which includes one or more records corresponding to a purchasing organization, may be determined based on one or more of: (i) a relevance of the one or more records to the context information, (ii) a relevance of the one or more records to the purchasing organization of a present contract, or (iii) a frequency of certain words included in text corresponding to the one or more records. Determining the first set of weights and the second set of weights may include using a weighting algorithm. The weighting algorithm may use, in some aspects, the weighting routine 196*b* comprising one or more computer-executable instructions that, when executed, cause a computer system (e.g., the computer system 110) to determine weights corresponding to data and/or information. In some aspects, the weighting algorithm may use statistics, quantitative models, and/or linear algebra. In other aspects, the weighting algorithm may use machine learning with supervised and/or unsupervised learning and may include using natural language processing models, computer vision, object/speech recognition, etc., which may be the same as or similar to machine learning implementations described elsewhere herein, including the machine learning programs, algorithms, techniques, and processes described corresponding to processes 200A-200C. In some aspects, as new instances of data from the two datasets are ingested, one or more weights of the first set of weights and/or the second set of weights already determined for previously-ingested instances of data may be adjusted dynamically. For example, if a new instance of record data that is especially important and/or relevant were ingested, previously-ingested instances of record data may have their weights of the first set of weights adjusted to be a lower weight so that the new instance of public data may have a comparatively higher weight. In some aspects, weights are adjusted dynamically after certain conditions are met, to avoid overly-frequent recalculations and accordingly, reduce computational burden. For example, weights may only be dynamically adjusted every 10 instances of data that are ingested, and/or after a certain amount of time has passed since the latest ingesting of an instance of data. The first weights corresponding to the record data and the second set of weights corresponding to the public data (and, possibly the weighting algorithm) may each be stored by a server and/or database (neither illustrated), or one or more of: the RAM 184, the MPs 182, or the data storage 192 of the computer system 110.

At block 312A predicted resource allocation information is generated. The predicted resource allocation information may be related to the context information. The predicted resource allocation information may be generated based on: (i) the ingested record data and the corresponding first set of weights, and (ii) the ingested public data and the corresponding second set of weights. The predicted resource allocation information may include correlations between specific resource allocation input decisions and specific resource allocation results. In particular, trends may emerge between plans, actions, strategies, technologies, operations, and policies and specific resource allocation results. The predicted resource allocation information may provide insights into a purchasing organization's resource allocation behavior given input decisions from one or more providing organizations; insights which may be used, for example, to improve resource allocation efficiency. The predicted resource allocation information may include one or more of: (i) information corresponding to a predicted future contract (e.g., what a contract is, where a contract is, who or what will be involved in a contract, what the size and/or budget of a contract is, etc.), (ii) information corresponding to predicted competitors, wherein the predicted competitors are predicted to bid on a contract of a purchasing organization (e.g., who predicted competitors are, how predicted competitors will bid on a contract, what the strengths and weaknesses are of predicted competitors, etc.), (iii) information corresponding to a predicted strategy for improving a likelihood of a providing organization being selected by the purchasing organization to fill a contract (e.g., what a providing organization should bid, who and/or what a providing organization should cooperate and/or network with, how a providing organization should market themselves, etc.) or (iv) information corresponding to a predicted winning providing organization, wherein the predicted winning providing organization is predicted to be selected by the purchasing organization to fill a contract (e.g, which providing organizations commonly win contracts for a given purchasing organization, what a predicted winning organization will bid, why a predicted winning organization will win a contract, etc.). In some aspects, generating the predicted resource allocation information includes using statistics, quantitative models, and/or linear algebra. In other aspects, generating the predicted resource allocation information includes using machine learning with supervised and/or unsupervised learning which may be the same as or similar to machine learning implementations described elsewhere herein, including the machine learning programs, algorithms, techniques, and processes described corresponding to processes 200A-200C. The predicted resource allocation information may be stored by a server and/or database (neither illustrated), or one or more of: the RAM 184, the MPs 182, or the data storage 192 of the computer system 110.

At block 314A, the predicted resource allocation information may be displayed. The predicted resource allocation information be displayed using one or more suitable data visualization techniques. Example suitable data visualization techniques may include one or more of: charts, tables, plots, graphs, maps, diagrams, histograms, etc. More specific examples of suitable data visualization techniques may include one or more of: bar charts, pie charts, donut charts, half donut charts, multilayer pie charts, line charts, scatter plots, cone charts, pyramid charts, funnel charts, radar triangles, radar polygons, area charts, tree charts, flowcharts, tables, geographic maps, icon arrays, percentage bars, gauges, radial wheels, concentric circles, Gantt charts, circuit diagrams, timelines, Venn diagrams, histograms, mind maps, dichotomous keys, Pert charts, choropleth maps, Cartesian graphs, box and whisker plots, Hexbin plots, heat maps, pair plots, KDE charts, time series charts, correlograms, violin plots, raincloud plots, stem-and-leaf plots, bubble charts, pictogram graphs, or other suitable data visualization techniques. In some aspects, the predicted resource allocation information is displayed on the display 162 of the computer system 110. In other aspects, the predicted resource allocation information is read aloud to the user using the speaker 164 of the computer system 110. The predicted resource allocation information may be displayed on the display 162 of the computer system 110 either automatically, and/or in response to a request. The predicted resource allocation information may be displayed automatically in response to the predicted resource allocation information is generated. When the predicted resource allocation information is displayed in response to a request, the request may have originated from the computer system 110, for example, due to the user of the computer system 110 requesting the predicted resource allocation information to be displayed. The display of the predicted resource allocation information may be stored by a server and/or database (neither illustrated), or one or more of: the RAM 184, the MPs 182, or the data storage 192 of the computer system 110.

In some aspects, either in alternative or addition to causing the predicted resource allocation information to be displayed (block 314A), an automatic action may be caused to occur in response to and based on, the generation of the predicted resource allocation information. This automatic action could include any one of: placing a bid for a contract, creating and/or answering a RFQ, contacting one or more entities (e.g., individuals, organizations, etc.), producing and/or creating a good and/or service (e.g., starting production of a product), selecting a providing organization to fill a contract, etc. Causing the automatic action to occur may be done using the computing environment 100 of FIG. 1.

Figure 3B:
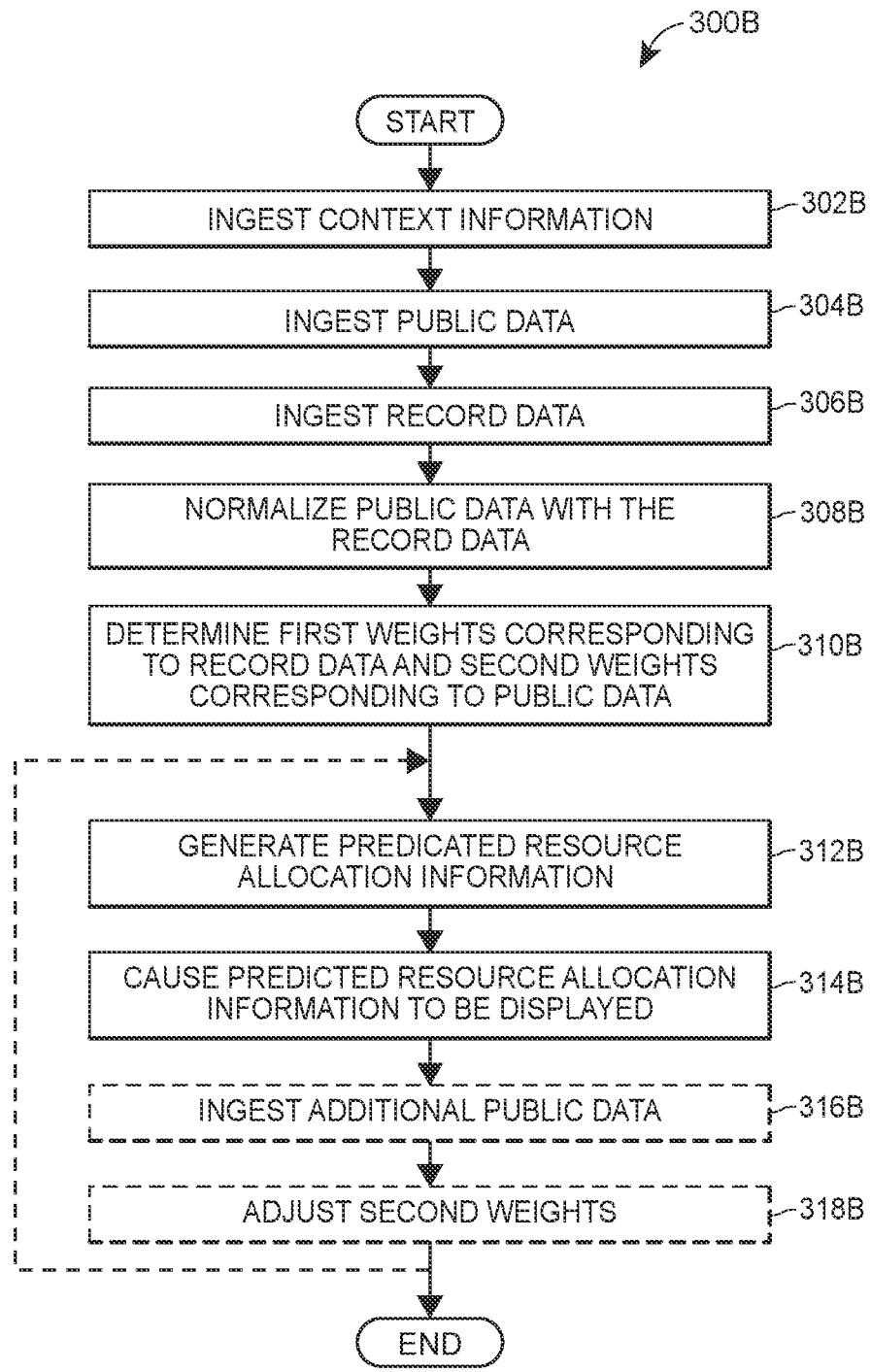
FIG. 3B illustrates a flow diagram of an exemplary method for generating predicted resource allocation information of an organization and dynamically adjusting weights in response to ingesting additional public data, according to some aspects.

Exemplary Computer-Implemented Predicted Resource Allocation Information Generation FIG. 3B illustrates a flow diagram of an exemplary computer-implemented method 300B for generating predicted resource allocation information of an organization and dynamically adjusting weights in response to ingesting additional public data. The method 300B includes ingesting context information (block 302B), ingesting public data (block 304B), ingesting record data (306B), normalizing public data with record data (308B), determining a first set of weights corresponding to the record data and a second set of weights corresponding to the public data (block 310B), generating predicted resource allocation information (block 312B), causing the predicated resource allocation information to be displayed (block 314B), ingesting additional public data (block 316B), adjusting the second set of weights (block 318B), and then returning to block 312B. At least some of the method 300B may use the computing environment 100 of FIG. 1. At least some of the method 300B may be the same as or similar to the processes illustrated in FIGS. 2A-2C, including, for example, the processes of ingesting context information, ingesting public data, ingesting record data, and/or determining the first set of weights corresponding to the record data and the second of weights corresponding to the public data.

The method 300B may begin, in some aspects, with the same or similar steps as blocks 302A-314A. Thus, block 302B, block 304B, block 306B, block 308B, block 310B, block 312B, and block 314B may each be similar to or equivalent to each of block 302A, block 304A, block 306A, block 308A, block 310A, block 312A, and block 314A, respectively.

At block 316B, additional public data may be ingested. The additional public data may have been provided by the public data source 130 to the computer system 110 via the network 150. At block 316B, the computer system 110 may ingest the public data which may be similar to, for example, the website text 202A and/or the second social media post 204B. The additional public data may include a one or more additional information sources. At least some of the one or more additional information sources may be the same, similar, and/or different than the information sources corresponding to the public data of block 304A. The one or more additional information sources may include, for example, one or more of: social media information, news information, blog information, or other publicly-accessible data. In some aspects, ingesting the additional public data may include parsing and/or interpreting the additional public data via, applying a natural language processing model to the public data. The natural language processing model may be a machine learning model. Such natural language processing may include identifying words, phrases, and/or groups of words sharing common attributes, such as root, general meanings, formatting, sentence structure, etc. Ingesting the additional public data may have been initiated automatically, such as, in response to the identification of the additional public data becoming newly available. For example, the additional public data may not have been available at the time the public data was ingested (e.g., not yet published or written). In another example, the additional public data was not identified at the time the public data was ingested. Alternatively, the additional public data may be ingested in response to a request, such as, from the user of the computer system 110 manually inputting the additional public data. The user may wish to manually input the additional public data, if, for example, the user identifies instances of data they would like to have included in the generation of predicted resource allocation information. Alternatively, the additional public data may be ingested in response to a request for the computer system 110 to receive additional public data from the public data source 130. While block 316B relates to ingesting the additional public data, it is worth noting that in other aspects, additional record data may be additionally or alternatively ingested at this step, using similar processes and techniques as described herein for ingesting the additional public data.

At block 318B, the second set of weights may be adjusted. The second set of weights may now correspond to both the public data originally ingested at block 304B and the additional public data ingested at block 318B. As previously described, weights may affect how instances of data from the two datasets are considered in generating predicted resource allocation information. The second set of weights are adjusted to account for the additional public data that is ingested. The second set of weights may be adjusted based on one or more of: (i) a reliability of each of the one or more information sources and the additional information sources, (ii) a relevance of each of the one or more information sources and the additional information sources to the context information, (iii) a relevance of each of the one or more information sources and the additional information sources to the organization, or (iv) a frequency of certain words included in text corresponding to each of the one or more information sources and additional information sources. Similarly as determining the second set of weights originally, adjusting the second set of weights may include using a weighting algorithm. The weighting algorithm may, in some aspects, use the weighting routine 196b comprising one or more computer-executable instructions that, when executed, cause a computer system (e.g., the computer system 110) to determine weights corresponding to data and/or information. In some aspects, the weighting algorithm may use statistics, quantitative models, and/or linear algebra. In other aspects, the weighting algorithm may use machine learning with supervised or unsupervised learning and may include using natural language processing models, computer vision, object/speech recognition, etc., which may be the same as or similar to machine learning implementations described elsewhere herein, including the machine learning programs, algorithms, techniques, and processes described corresponding to processes 200A-200C. While block 318B relates to ingesting the additional public data, it is worth noting that in the other aspect where additional record data may be additionally or alternatively ingested, similar processes and techniques as described herein for adjusting the second set of weights may be done for adjusting the first set of weights. The adjusted second set of weights corresponding to the public data may be stored by a server and/or database (neither illustrated), or one or more of: the RAM 184, the MPs 182, or the data storage 192 of the computer system 110.

After the second set of weights are updated at block 318B, the method 300B may return to block 312B and re-generate the predicted resource allocation information of the organization related to the context information based on (i) the ingested record data and the corresponding first set of weights, and (ii) the ingested public data (wherein the public data now includes both the public data originally ingested at block 304B and the additional public data ingested at block 318B) and the corresponding second set of weights (wherein the corresponding second set of weights are now adjusted). This process may continue in a repetitive manner, advancing next to block 314B, eventually advancing to block 318B, returning to block 314B, etc., repeating any number of times.

Figure 3C:
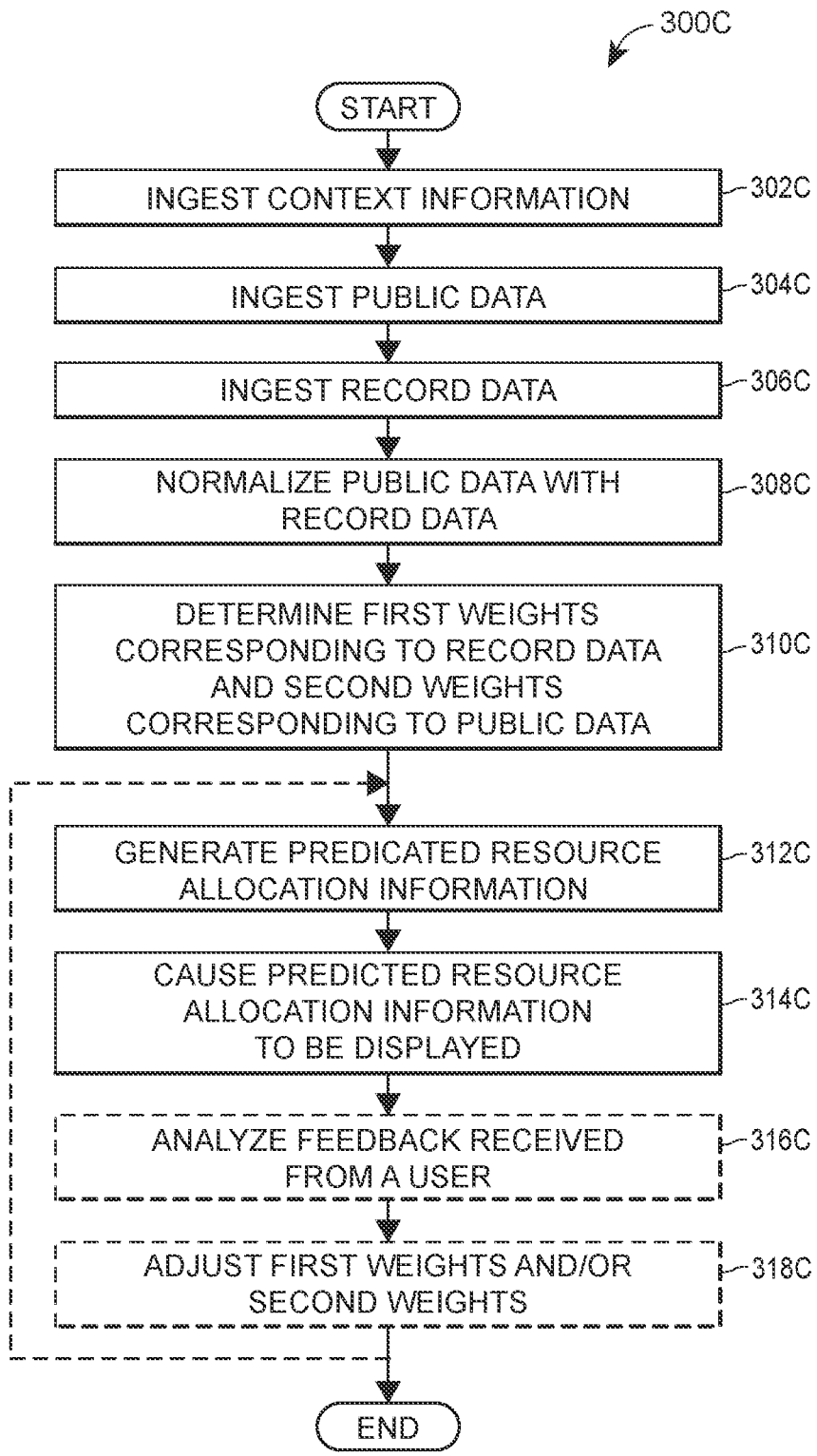
FIG. 3C illustrates a flow diagram of an exemplary method for generating predicted resource allocation information of an organization and dynamically adjusting weights in response to analyzing feedback, according to some aspects.

Exemplary Computer-Implemented Predicted Resource Allocation Information Generation FIG. 3C illustrates a flow diagram of an exemplary computer-implemented method 300C for generating predicted resource allocation information of an organization and dynamically adjusting weights in response to ingesting additional public data. The method 300C includes ingesting context information (block 302C), ingesting public data (block 304C), ingesting record data (306C), normalizing public data with record data (308C), determining a first set of weights corresponding to the record data and a second set of weights corresponding to the public data (block 310C), generating predicted resource allocation information (block 312C), causing the predicated resource allocation information to be displayed (block 314C), analyzing feedback received from a user (block 316C), adjusting the first set of weights and/or the second set of weights (block 318C), and then returning to block 312C. At least some of the method 300C may use the computing environment 100 of FIG. 1. At least some of the method 300C may be the same as or similar to the processes illustrated in FIGS. 2A-2C, including, for example, the processes of ingesting context information, ingesting public data, ingesting record data, and/or determining the first set of weights corresponding to the record data and the second of weights corresponding to the public data.

The method 300C may begin, in some aspects, with the same or similar steps as blocks 302A-314A. Thus, block 302C, block 304C, block 306C, block 308C, block 310C, block 312C, and block 314C may each be similar to or equivalent to each of block 302A, block 304A, block 306A, block 308A, block 310A, block 312A, and block 314A, respectively.

At block 316C, feedback received from a user, the feedback corresponding to the predicted resource allocation information, is analyzed. The feedback may include a user's perception on if the predicted resource allocation information is helpful, relevant, useful, important, etc. Feedback may include whether or not the predicted resource allocation information came true (i.e., how the predicted resource allocation information compares to the ground truth). For example, if a predicted resource allocation information includes that a providing organization will likely win a contract by bidding a certain amount, if the providing organization actually does bid this amount, a user may enter whether or not the providing organization in fact won the contract. Analyzing feedback regarding may be performed the computer system 110. Analyzing feedback regarding the key text may have been initiated either automatically, and/or in response to a request. The analysis of the predicted resource allocation information of phrases may be stored by a server and/or database (neither illustrated), or one or more of: the RAM 184, the MPs 182, or the data storage 192 of the computer system 110.

At block 318C, the first set of weights and/or the second set of weights may be adjusted. Adjusting the first set of weights and/or the second set of weights may include adjusting a weighting algorithm used for determining the first set of weights and/or the second set of weights. The weighting algorithm, in some aspects, may use the weighting routine 196*b* comprising one or more computer-executable instructions that, when executed, cause a computer system (e.g., the computer system 110) to determine weights corresponding to data and/or information. In some aspects, the weighting algorithm may use statistics, quantitative models, and/or linear algebra. In other aspects, the weighting algorithm may use machine learning with supervised or unsupervised learning and may include using natural language processing models, computer vision, object/speech recognition, etc., which may be the same as or similar to machine learning implementations described elsewhere herein, including the machine learning programs, algorithms, techniques, and processes described corresponding to processes 200A-200C. The adjusted first set of weights and/or the second set of weights set of weights (and, possibly the adjusted weighting algorithm) may be stored by a server and/or database (neither illustrated), or one or more of: the RAM 184, the MPs 182, or the data storage 192 of the computer system 110.

After the first set of weights and/or the second set of weights are updated at block 318C, the method 300C may return to block 312B and re-generate the predicted resource allocation information of the organization related to the context information based on (i) the ingested record data and the corresponding first set of weights, and (ii) the ingested public data and the corresponding second set of weights (wherein the first set of weights and/or the second set of weights are now adjusted). This process may continue in a repetitive manner, advancing next to block 314C, eventually advancing to block 318C, returning to block 312C, etc., repeating any number of times.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various aspects, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In aspects in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Unless specifically stated otherwise, discussions herein using words such as "processing," "computing," "calculating," "determining," "presenting," "displaying," "ingesting," "generating," "causing," "analyzing," "adjusting," "normalizing," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of aspects herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible aspect, as describing every possible aspect would be impractical, if not impossible. One could implement numerous alternate aspects, using either current technology or technology developed after the filing date of this application.

Upon reading this disclosure, those of skill in the art will appreciate still additional alternative structural and functional designs for systems and methods according to the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of methods and apparatuses disclosed herein without departing from the spirit and scope defined in the appended claims.

Although the foregoing text sets forth a detailed description of numerous different aspects, it should be understood that the legal scope of the invention is defined by the words of the claims set forth at the end of this patent. The particular features, structures, or characteristics of any specific aspect may be combined in any suitable manner and in any suitable combination with one or more other aspects, including the use of selected features without corresponding use of other features. It is to be understood that other variations and modifications of aspects of present techniques described and illustrated herein are possible in light of the teachings herein and are to be considered part of the spirit and scope of present techniques. The detailed description is to be construed as exemplary only and does not describe every possible aspect, as describing every possible aspect would be impractical, if not impossible. One could implement numerous alternate aspects, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

What is claimed:

1. A computer system for generating predicted resource allocation information of an organization, comprising:
   one or more processors; and
   a program memory coupled to the one or more processors and storing executable instructions that, when executed by the one or more processors, cause the computer system to:
   ingest context information including one or more of a seed identifier identifying an entity or an area of interest;
   ingest, based on the context information, public data including one or more information sources, wherein ingesting the public data includes identifying one or more hashtags in the public data;
   ingest, based on the context information, record data including one or more records corresponding to the organization;
   normalize the ingested public data with the ingested record data;
   determine a first set of weights each corresponding to a respective record of the ingested record data;
   determine a second set of weights each corresponding to an information source of the ingested public data by processing the public data using a machine learning model trained to identify information that is of value to the organization;
   generate predicted resource allocation information of the organization related to the context information based on (a) the ingested record data and the corresponding first set of weights, and (b) the ingested public data and the corresponding second set of weights, wherein the predicted resource allocation information of the organization includes at least one of information corresponding to a predicted future contract, information corresponding to predicted competitors, wherein the predicted competitors are predicted to bid on a contract of a purchasing organization, information corresponding to a predicted strategy for improving a likelihood of a providing organization being selected by the purchasing organization to fill a contract or information corresponding to a predicted winning providing organization, wherein the predicted winning providing organization is predicted to be selected by the purchasing organization to fill a contract;
   iteratively refine the predicted resource allocation information based on additional data ingestion and feedback received from users by dynamically adjusting the first set of weights and/or the second set of weights to enhance accuracy and relevance of the predicted resource allocation information; and
   cause the predicted resource allocation information of the organization to be displayed, wherein the display of the predicted resource allocation information is dynamically updated based on additional ingested data and feedback received from users to refine the accuracy and relevance of the predicted resource allocation information.

2. The computer system of claim 1, wherein the record data comprises one or more of:
   manually-ingested record data related to previous resource allocation by the organization, or
   automatically-ingested record data related to previous resource allocation by the organization.

3. The computer system of claim 1, the program memory storing further executable instructions that, when executed by the one or more processors, cause the computer system to:
   ingest a first portion of the public data via input from a user; and
   ingest a second portion of the public data via a webcrawler.

4. The computer system of claim 1, the program memory storing further executable instructions that, when executed by the one or more processors, cause the computer system to:
cause an automatic action to occur in response to and based on, the generation of the predicted resource allocation information.

5. The computer system of claim 1, the program memory storing further executable instructions that, when executed by the one or more processors, cause the computer system to:
ingest, based on the context information, additional public data including one or more additional information sources; and
adjust the second set of weights in response to ingesting the additional public data.

6. The computer system of claim 1, the program memory storing further executable instructions that, when executed by the one or more processors, cause the computer system to:
determine the second set of weights based on one or more of:
a reliability of each of the one or more information sources,
a relevance of each of the one or more information sources to the context information,
a relevance of each of the one or more information sources to the organization, or
a frequency of certain words included in text corresponding to each of the one or more information sources.

7. The computer system of claim 1, the program memory storing further executable instructions that, when executed by the one or more processors, cause the computer system to:
analyze the feedback received from the users, the feedback corresponding to the predicted resource allocation information; and
adjust one or more of the first set of weights or the second set of weights based on the feedback from the users.

8. A computer-implemented method for generating predicted resource allocation information of an organization, comprising:
ingesting, by one or more processors, context information including one or more of a seed identifier identifying an entity or an area of interest;
ingesting, by the one or more processors, based on the context information, public data including one or more information sources, wherein ingesting the public data includes identifying one or more hashtags in the public data;
ingesting, by the one or more processors, based on the context information, record data including one or more records of the organization;
normalizing, by the one or more processors, the ingested public data with the ingested record data;
determining, by the one or more processors, a first set of weights each corresponding to a respective record of the ingested record data;
determining, via the one or more processors, a second set of weights each corresponding to an information source of the ingested public data by processing the public data using a machine learning model trained to identify information that is of value to the organization;
generating, by the one or more processors, predicted resource allocation information of the organization related to the context information based on (a) the ingested record data and the corresponding first set of weights, and (b) the ingested public data and the corresponding second set of weights, wherein the predicted resource allocation information of the organization includes at least one of information corresponding to a predicted future contract, information corresponding to predicted competitors, wherein the predicted competitors are predicted to bid on a contract of a purchasing organization, information corresponding to a predicted strategy for improving a likelihood of a providing organization being selected by the purchasing organization to fill a contract or information corresponding to a predicted winning providing organization, wherein the predicted winning providing organization is predicted to be selected by the purchasing organization to fill a contract;
iteratively refining the predicted resource allocation information based on additional data ingestion and feedback received from users by dynamically adjusting the first set of weights and/or the second set of weights to enhance accuracy and relevance of the predicted resource allocation information; and
causing, by the one or more processors, the predicted resource allocation information of the organization related to the context information to be displayed, wherein the display of the predicted resource allocation information is dynamically updated based on additional ingested data and feedback received from users to refine the accuracy and relevance of the predicted resource allocation information.

9. The computer-implemented method of claim 8, wherein the record data comprises one or more of:
manually-ingested record data related to previous resource allocation by the organization, or
automatically-ingested record data related to previous resource allocation by the organization.

10. The computer-implemented method of claim 8, further comprising:
causing an automatic action to occur in response to and based on, the generation of the predicted resource allocation information.

11. The computer-implemented method of claim 8, wherein the one or more information sources include one or more of: social media information, news information, blog information, or other publicly-accessible data.

12. The computer-implemented method of claim 8, further comprising:
ingesting, by the one or more processors, based on the context information, additional public data including one or more additional information sources; and
adjusting, by the one or more processors, the second set of weights in response to ingesting the additional public data.

13. The computer-implemented method of claim 8, further comprising:
determining the second set of weights based on one or more of:
a reliability of each of the one or more information sources,
a relevance of each of the one or more information sources to the context information,
a relevance of each of the one or more information sources to the organization, or
a frequency of certain words included in text corresponding to each of the one or more information sources.

14. The computer-implemented method of claim 8, further comprising:
    analyzing the feedback received from the users, the feedback corresponding to the predicted resource allocation information; and
    adjusting one or more of the first set of weights or the second set of weights based on the feedback from the users.

15. A tangible, non-transitory computer-readable medium storing executable instructions for generating predicted resource allocation information of an organization that when executed, cause a computer to:
    ingest context information including one or more of a seed identifier identifying an entity or an area of interest;
    ingest, based on the context information, public data including one or more information sources, wherein ingesting the public data includes identifying one or more hashtags in the public data;
    ingest, based on the context information, record data including one or more records of the organization;
    normalize the ingested public data with the ingested record data;
    determine a first set of weights each corresponding to a respective record of the ingested record data;
    determine a second set of weights each corresponding to an information source of the ingested public data by processing the public data using a machine learning model trained to identify information that is value to the organization;
    generate predicted resource allocation information of the organization related to the context information based on (a) the ingested record data and the corresponding first set of weights, and (b) the ingested public data and the corresponding second set of weights, wherein the predicted resource allocation information of the organization includes at least one of information corresponding to a predicted future contract, information corresponding to predicted competitors, wherein the predicted competitors are predicted to bid on a contract of a purchasing organization, information corresponding to a predicted strategy for improving a likelihood of a providing organization being selected by the purchasing organization to fill a contract or information corresponding to a predicted winning providing organization, wherein the predicted winning providing organization is predicted to be selected by the purchasing organization to fill a contract;
    iteratively refine the predicted resource allocation information based on additional data ingestion and feedback received from users by dynamically adjusting the first set of weights and/or the second set of weights to enhance accuracy and relevance of the predicted resource allocation information; and
    cause the predicted resource allocation information of the organization to be displayed, wherein the display of the predicted resource allocation information is dynamically updated based on additional ingested data and feedback received from users to refine the accuracy and relevance of the predicted resource allocation information.

16. The tangible, non-transitory computer-readable medium of claim 15, wherein the record data comprises one or more of:
    manually-ingested record data related to previous resource allocation by the organization, or
    automatically-ingested record data related to previous resource allocation by the organization.

17. The tangible, non-transitory computer-readable medium of claim 15 storing further executable instructions that when executed, cause a computer to:
    ingest a first portion of the public data via input from a user; and
    ingest a second portion of the public data via a webcrawler.

18. The tangible, non-transitory computer-readable medium of claim 15 storing further executable instructions that when executed, cause a computer to:
    cause an automatic action to occur in response to and based on, the generation of the predicted resource allocation information.

19. The tangible, non-transitory computer-readable medium of claim 15 storing further executable instructions that when executed, cause a computer to:
    ingest, based on the context information, additional public data including one or more additional information sources; and
    adjust the second set of weights in response to ingesting the additional public data.

20. The tangible, non-transitory computer-readable medium of claim 15 storing further executable instructions that when executed, cause a computer to:
    analyze the feedback received from the users, the feedback regarding accuracy of the predicted resource allocation information; and
    adjust one or more of the first set of weights or the second set of weights based on the feedback from the users.

* * * * *